United States Patent
Oikawa et al.

(10) Patent No.: US 10,755,711 B2
(45) Date of Patent: Aug. 25, 2020

(54) INFORMATION PRESENTATION DEVICE, INFORMATION PRESENTATION SYSTEM, AND TERMINAL DEVICE

(71) Applicant: ALPINE ELECTRONICS, INC., Tokyo (JP)

(72) Inventors: Taku Oikawa, Fukushima (JP); Tomoko Kanamori, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 111 days.

(21) Appl. No.: 16/158,422

(22) Filed: Oct. 12, 2018

(65) Prior Publication Data

US 2019/0122664 A1  Apr. 25, 2019

(30) Foreign Application Priority Data

Oct. 25, 2017 (JP) .................................. 2017-206494

(51) Int. Cl.
| | |
|---|---|
| *G10L 15/22* | (2006.01) |
| *G10L 15/08* | (2006.01) |
| *G06F 16/9032* | (2019.01) |
| *G10L 25/54* | (2013.01) |

(52) U.S. Cl.
CPC ........ *G10L 15/22* (2013.01); *G06F 16/90332* (2019.01); *G10L 15/08* (2013.01); *G10L 25/54* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,331,036 B1* | 2/2008 | Hambleton ........... | H04M 3/493 717/105 |
| 7,885,815 B2* | 2/2011 | Anselmetti ........... | H04M 3/533 704/258 |
| 7,940,914 B2* | 5/2011 | Petrushin ............... | G10L 17/26 379/265.06 |
| 2002/0143546 A1* | 10/2002 | Layng ..................... | G09B 5/00 704/270 |
| 2003/0023435 A1* | 1/2003 | Josephson .............. | G10L 15/26 704/235 |
| 2003/0163299 A1* | 8/2003 | Iliff ........................ | G16H 10/60 704/1 |

(Continued)

FOREIGN PATENT DOCUMENTS

JP   2001-296888   10/2001

*Primary Examiner* — Thuykhanh Le
(74) *Attorney, Agent, or Firm* — IPUSA, PLLC

(57) ABSTRACT

There is provision of an information presentation device including a displaying unit, an input receiving unit configured to receive an input from a user, an answer generating unit configured to generate an answer sentence in response to the input received by the input receiving unit, an additional information acquiring unit configured to acquire additional information related to a word contained in the answer sentence generated by the answer generating unit, a voice outputting unit configured to output the answer sentence by sound, and an information outputting unit configured to output the additional information on the displaying unit.

11 Claims, 22 Drawing Sheets

(56) References Cited

U.S. PATENT DOCUMENTS

| | | | |
|---|---|---|---|
| 2006/0111894 A1* | 5/2006 | Sammarco | G06Q 10/06 704/9 |
| 2006/0286969 A1* | 12/2006 | Talmor | G06Q 20/341 455/415 |
| 2008/0114845 A1* | 5/2008 | Rao | G06Q 30/02 709/206 |
| 2010/0063823 A1* | 3/2010 | Wu | G10L 13/00 704/275 |
| 2011/0106534 A1* | 5/2011 | LeBeau | G01C 21/3608 704/235 |
| 2013/0041668 A1* | 2/2013 | Nakajima | G10L 13/00 704/260 |
| 2013/0173034 A1* | 7/2013 | Reimann | G06F 3/0484 700/94 |
| 2014/0337033 A1* | 11/2014 | Kim | A61H 3/06 704/260 |
| 2014/0337733 A1* | 11/2014 | Rodriguez | G10L 17/005 715/718 |
| 2015/0012884 A1* | 1/2015 | Hayasaka | G06F 3/0482 715/811 |
| 2015/0169284 A1* | 6/2015 | Quast | G06F 16/9535 704/275 |
| 2016/0034930 A1* | 2/2016 | Verschoor | G06Q 30/0282 705/7.32 |
| 2016/0104486 A1* | 4/2016 | Penilla | G10L 15/005 704/232 |
| 2016/0255494 A1* | 9/2016 | Shin | H04M 1/72552 455/415 |
| 2017/0268893 A1* | 9/2017 | Nakanishi | G01C 21/3476 |
| 2018/0075847 A1* | 3/2018 | Lee | G06F 16/3329 |
| 2018/0222471 A1* | 8/2018 | Kiyokawa | G07C 5/04 |
| 2018/0281818 A1* | 10/2018 | Ebina | G08G 1/01 |

\* cited by examiner

FIG.1

DRIVER

Tell me concert information being held soon.

NATURAL LANGUAGE DIALOGUE SYSTEM

Three rock concerts and two classical music concerts will be held in spare time on your calendar.
Would you like to go with your wife?

DRIVER

...Lots of information···
I'm confused what was said.

FIG.3
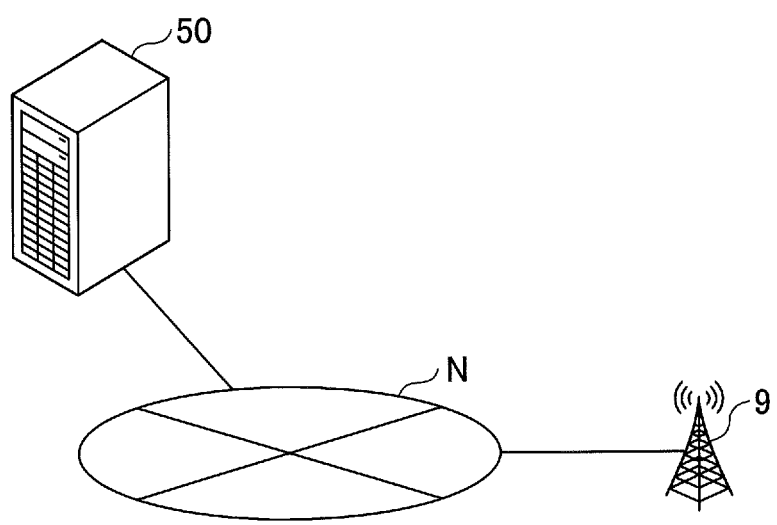
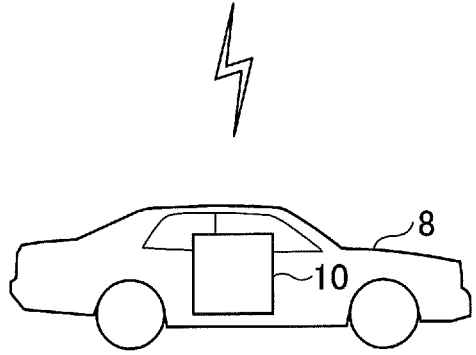

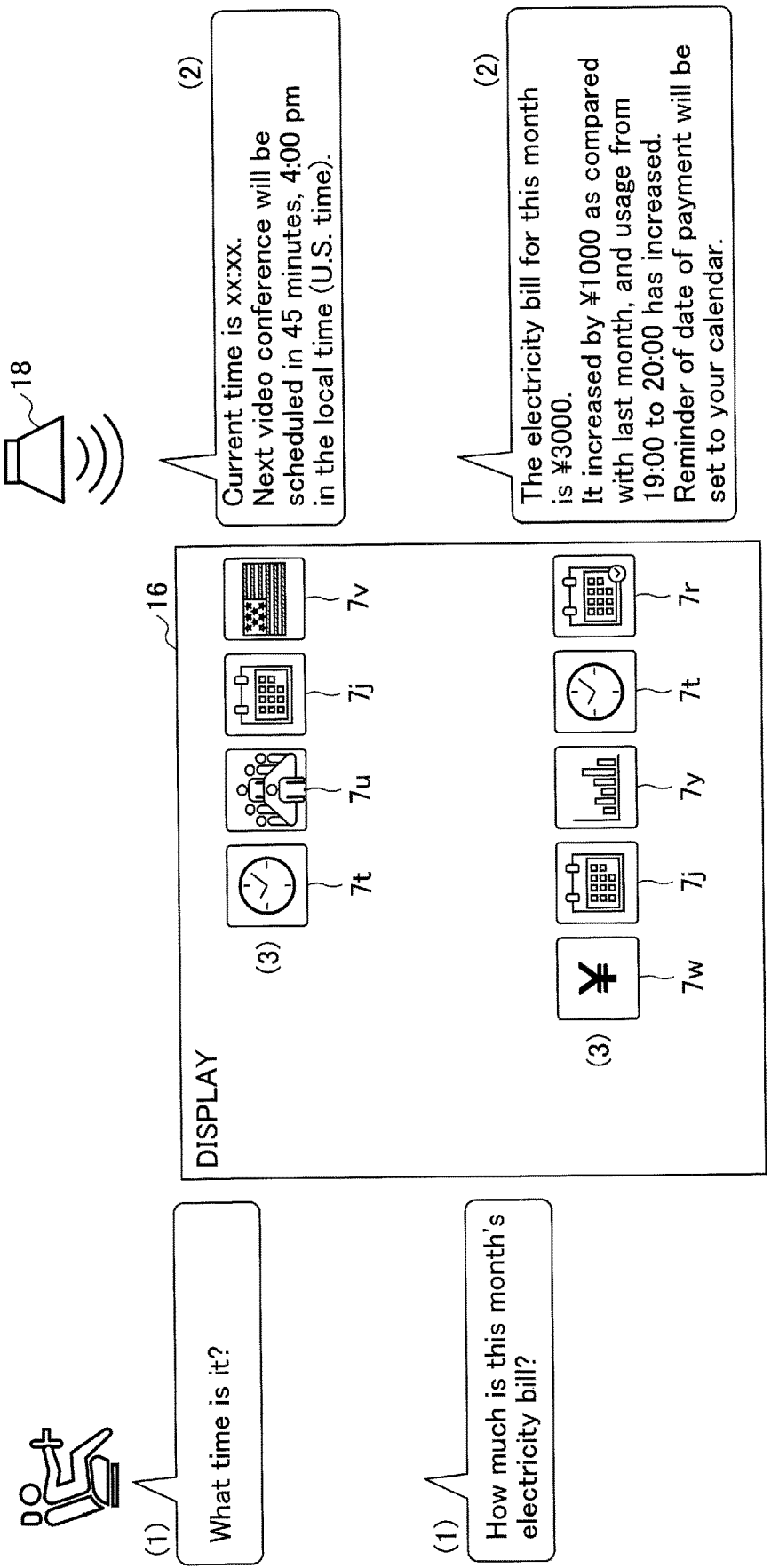

FIG.15

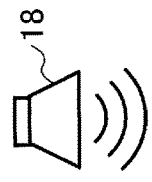

(2) No vacancy at a quick charging station nearby.
Would you like to choose a vacant quick charging station?
As there is free time in your calendar, I can show you a normal charging station with a coffee shop.

(2) Three parks and an amusement park are found nearby.
But as rain is forecasted today, a movie theater is recommended.

DISPLAY (3) 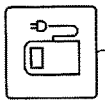 7z   7j  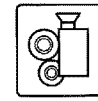 7aa  7bb (3) 7cc  7dd  7ee  7ff

(1) Tell me a charging station nearby.

(1) Is there any place near here where children can have fun?

(4) I'd like to go to the movie theater.

FIG.16
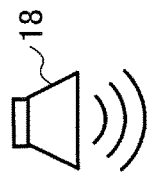
(1) I'd like to make a hotel reservation for my business trip at this weekend.
(2) Are you going there by car, or by train?
(3) 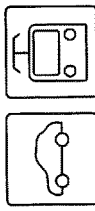 7gg 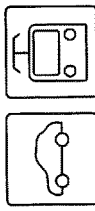 7hh
(4) By train.
(5) Regarding your business trip to Kyoto on xx/yy, 3 hotels with parking lots having vacant rooms are found near Kyoto station.
There is a hotel near which a pottery market is held.
Would you like to reserve?
(6) 7r 7ii 7hh 7jj 7kk
(7) Yes, please.

FIG.22
| DIALOG ID | USER'S SPEECH | ANSWER SENTENCE | ICON | OPTIONS | DETAILED INFORMATION |
|---|---|---|---|---|---|
| 001 | Restaurant. | — | | — | — |
| 002 | — | Three popular restaurants are found. | 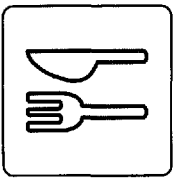 | 1.XXX<br>2.XXX<br>3.XXX | 001-1.html<br>001-2.html<br>001-3.html |
| 003 | I want to know a restaurant serving tasty lobster. | — | | — | — |
| 004 | — | I recommend a seaside restaurant serving delicious lobster. | 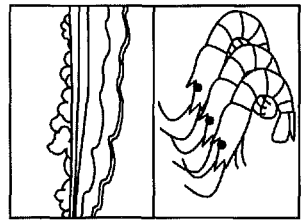 | 1.XXX<br>2.XXX<br>3.XXX | 002-1.html<br>002-2.html<br>002-3.html |

FIG.23
| WORD | ICON |
|---|---|
| RESTAURANT, EAT OUT, FAMILY RESTAURANT | 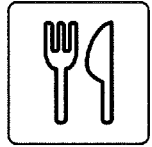 |
| SEA, SEASIDE, BEACH | 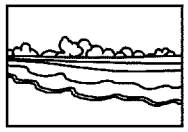 |
| LOBSTER, SHRIMP | 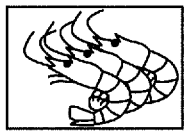 |
| PARKING LOT |  |
| WIFE |  |
| CALENDAR, SCHEDULE, PLAN | 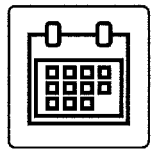 |
| PIANO |  |
| . . . | . . . |

INFORMATION PRESENTATION DEVICE, INFORMATION PRESENTATION SYSTEM, AND TERMINAL DEVICE

CROSS-REFERENCE TO RELATED APPLICATIONS

This patent application is based on and claims priority to Japanese Patent Application No. 2017-206494 filed on Oct. 25, 2017, the entire contents of which are incorporated herein by reference.

BACKGROUND OF THE INVENTION

1. Field of the Invention

The present invention generally relates to an information presentation device, an information presentation system, and a terminal device.

2. Description of the Related Art

A natural language dialogue system is known, which performs speech recognition, analyses intent of speech by a speaker, and outputs an appropriate answer. The natural language dialogue system is used in various environments. For example, a driver while driving a vehicle may be used because it is difficult for the driver to operate keys. In a case in which the natural language dialogue system outputs answer by sound, if the answer is short, the speaker can easily recognize the answer. But if the answer is getting longer, it is difficult for the speaker to recognize the answer thoroughly. Especially, in a case in which the speaker is a driver driving a vehicle, because the driver is concentrating his/her attention to driving, it is more difficult to recognize the answer thoroughly.

FIG. 1 illustrates an example of a conversation between a driver and the natural language dialogue system. The driver speaks "Tell me concert information being held soon," and the natural language dialogue system answers "Three rock concerts and two classical music concerts will be held in spare time on your calendar. Would you like to go with your wife?" However, because much information is answered, the driver cannot understand the answer.

Another natural language dialogue system is known, which displays text information on a display or the like, in response to an inquiry. However, it is difficult for a driver while driving a vehicle to closely view the text information. To solve such a problem, a technique for displaying multiple choices as an answer to a driver is proposed (see Patent Document 1, for example). Patent Document 1 discloses a request determination device which displays a destination designated by a driver as choices, and enables the driver to narrow candidates of the destination. If choices are displayed, the driver can make a choice in a short time. Accordingly, the drive can continue a conversation without closely viewing a display.

However, if choices alone are displayed, a driver may not be able to ascertain the choices that are being displayed, and the problem that a driver cannot understand contents easily is not solved. For example, even if three concert venues are displayed, what is played in each concert venue may not be ascertained. Even if a genre of a concert is additionally displayed for each concert venue, it takes time for a driver to look at a display.

Although the above described example is a conversation between a vehicle driver and the natural language dialogue system, a similar problem may occur to a pedestrian. For example, it is not preferable that a pedestrian carrying a smartphone is walking while closely viewing a screen of the smartphone. Further, even if a user of the natural language dialogue system is not moving, a case may occur in which the user cannot catch an entire long voice answer.

CITATION LIST

Patent Document

[Patent Document 1] Japanese Laid-Open Patent Publication No. 2001-296888

SUMMARY OF THE INVENTION

The present invention is made in light of the above problems, and provides an information presentation device capable of displaying information in a manner that can be easily ascertained.

There is provision of an information presentation device including a displaying unit, an input receiving unit configured to receive an input from a user, an answer generating unit configured to generate an answer sentence in response to the input received by the input receiving unit, an additional information acquiring unit configured to acquire additional information related to a word contained in the answer sentence generated by the answer generating unit, a voice outputting unit configured to output the answer sentence by sound, and an information outputting unit configured to output the additional information on the displaying unit.

BRIEF DESCRIPTION OF THE DRAWINGS

FIG. 1 illustrates an example of a conversation between a driver and a conventional natural language dialogue system;

FIG. 3 is an example of an overview configuration of the natural language dialogue system;

FIG. 14 is a diagram illustrating an example of answers presented by the natural language dialogue system;

FIG. 15 is a diagram illustrating an example of answers presented by the natural language dialogue system;

FIG. 16 is a diagram illustrating an example of answers presented by the natural language dialogue system;

FIG. 22 is an example of dialogue information stored in a dialogue information retention unit; and FIG. 23 is a diagram illustrating an example of correspondence between words and icons registered in an icon DB.

DETAILED DESCRIPTION OF EMBODIMENTS

Embodiments of the present invention will be described in the following, with reference to drawings.

<Outline of Operation of Natural Language Dialogue System>

Figure 2:
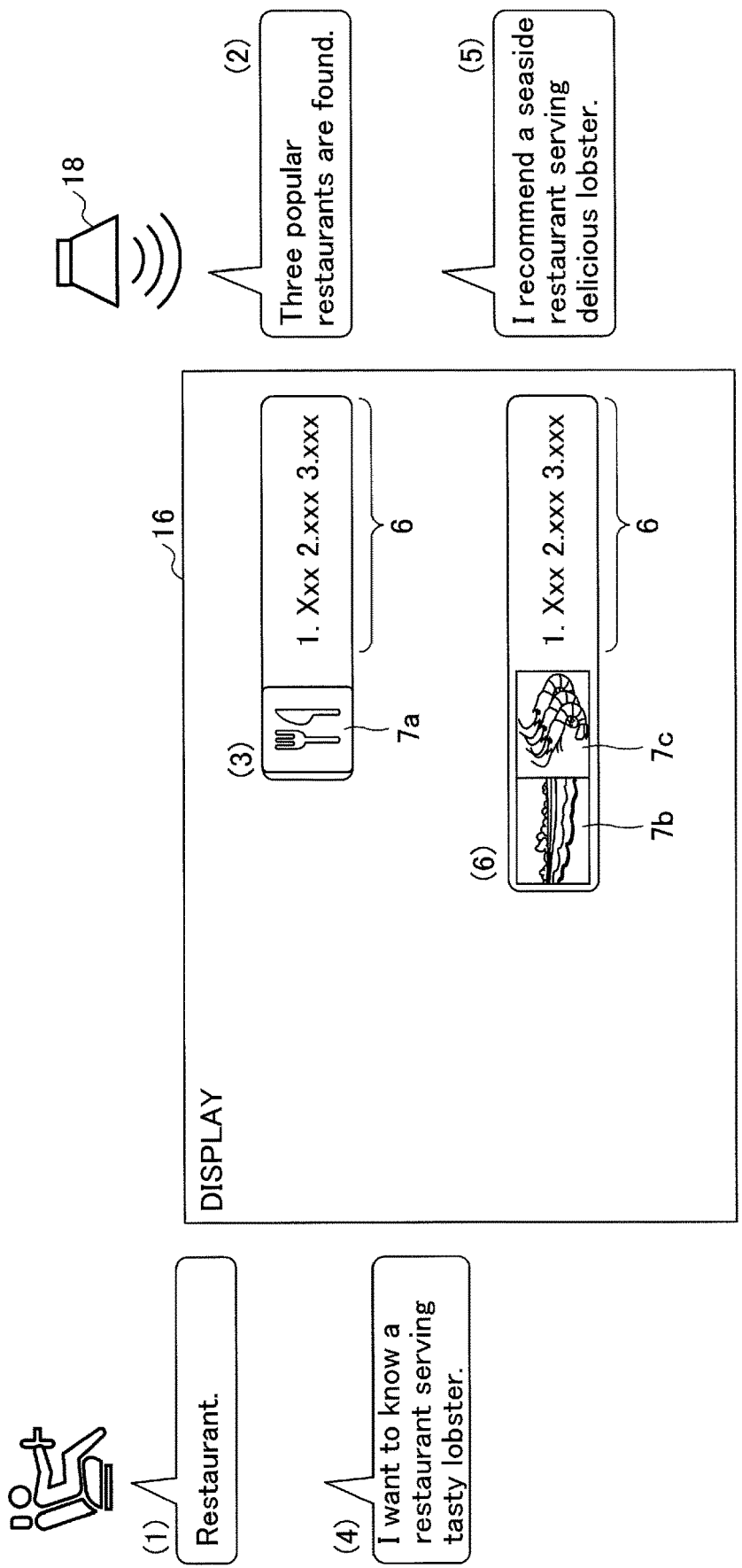
FIG. 2 is a diagram illustrating an example of answers presented by a natural language dialogue system.

FIG. 2 is a diagram illustrating an example of answers presented by a natural language dialogue system according to the present embodiment. The natural language dialogue system according to the present embodiment displays a topic recognized by the natural language dialogue system as an icon. Note that, in the following description, a reference number assigned to icons is 7, and to distinguish the icons from each other, the reference number "7" assigned to each of the icons is followed by a suffix of an alphabetical character.

(1) A driver speaks "Restaurant".

(2) By recognizing a word "restaurant" with speech recognition, the natural language dialogue system determines that a restaurant search is requested, and searches for a restaurant. As a result of the search, the natural language dialogue system outputs a voice answer "Three popular restaurants are found".

(3) The natural language dialogue system also displays, on a display 16, an icon 7a representing a restaurant and restaurant options 6.

(4) The driver can choose a restaurant from the options 6. However, in the example of FIG. 2, the driver speaks "I want to know a restaurant serving tasty lobster".

(5) By recognizing a sentence "I want to know a restaurant serving tasty lobsters" with speech recognition, the natural language dialogue system determines that the driver designates lobster dishes as a category of a restaurant, and searches for a restaurant serving lobsters. When searching for a restaurant, because designation of an area to be searched is required, the natural language dialogue system supplies information of an area in which a restaurant is searched. For example, if information that the driver likes the sea is registered as an attribute of the driver, or if a current location is near a seaside, by utilizing such information, the natural language dialogue system supplies the information "seaside" as an area to be searched. That the restaurant which has been found is a seaside restaurant may be utilized later. As a result of the search, the natural language dialogue system outputs a voice answer "I recommend a seaside restaurant serving delicious lobster".

(6) The natural language dialogue system determines an icon related to a word to which the driver has been referring, among words in the conversation. For example, the natural language dialogue system displays an icon 7b representing a seaside, and displays an icon 7c representing lobsters. The icon 7b representing a seaside is an icon having been determined by a word which has not been spoken by the driver. By tapping a restaurant from the options 6, the driver can request detailed information about the restaurant, or can make a reservation of the restaurant.

As described above, the natural language dialogue system according to the present embodiment displays the meaning of a recognized topic as the icon 7. Accordingly, a driver can intuitively understand an overview of what has been spoken (what is recommended) by the natural language dialogue system. For example, at (5) described above, the natural language dialogue system speaks about an area "seaside". However, because the driver has not spoken "seaside", the driver does not expect that a topic about a seaside comes up in the conversation. Thus, the driver is likely to mishear or fail to hear an unexpected topic. However, as the natural language dialogue system according to the present embodiment displays the icon 7b representing a seaside, as described at (6) described above, the driver can intuitively understand what has been spoken by the natural language dialogue system.

Definition of Terms

In the present disclosure, an "answer sentence" refers to a sentence presented by the natural language dialogue system. The answer is not necessarily fitted to a question. The answer includes a case in which the natural language dialogue system suddenly changes a topic, or in which the natural language dialogue system itself starts speaking.

A term "additional information" means information related to a word contained in an answer sentence. The additional information is information for supporting/assisting/supplementing understanding of a word. The additional information is, for example, an image such as an icon. But in addition to an image, sound or smell may be used as the additional information. In the present embodiment, when referring to the additional information, a word "icon" is used.

<Example of Configuration>

FIG. 3 is an example of an overview configuration of the natural language dialogue system 100. The natural language dialogue system 100 includes a dialogue control server 50, and an on-board terminal device 10 configured to communicate via a network N. The network N includes a public network provided by a telecommunications carrier such as a cellular network, a wireless LAN, or a WiMAX network, and a provider network provided by a network service provider (a business organization that provides a service to connect to the Internet). To enable the on-board terminal device 10 to connect to a public network provided by a telecommunications carrier, a base station 9 is connected to the network N.

The dialogue control server 50 is an information processing apparatus for interacting with a driver. The dialogue control server 50 is an example of an information presentation device in that the dialogue control server 50 generates information to be presented. A system targeted to achieve a specific task is referred to as a task-oriented dialogue system, and a system that has a chat with a person is referred to as a non-task-oriented dialogue system. In the present embodiment, the former system is assumed. However, the dialogue control server 50 may be the latter system. Note that functions of the dialogue control server 50 may be installed in the on-board terminal device 10. In this case, the dialogue control server 50 is not required. Further, in the present embodiment, a case in which the dialogue control server 50 performs a task of speech recognition is described. However, the speech recognition may be performed in another server.

The on-board terminal device 10 is an example of an information presentation device in that the on-board terminal device 10 presents information. The on-board terminal device 10 finds a route from a place of departure to a destination, renders the route and a current position on an electronic map displayed on a display, and guides a user towards an appropriate direction based on the route, by providing voice guidance or an animated image just before reaching a turning point. The on-board terminal device 10 may also have other functions such as an AV (Audio Visual) playback function, a communication function via the Internet, and the like. By driving a car (automobile) 8 in accordance with guidance provided by the on-board terminal device 10, a driver can arrive at a destination. Among the above described functions of the on-board terminal device 10, the function for finding a route may be performed by a certain server, and information of the route may be supplied from the server to the on-board terminal device 10. Further, the on-board terminal device 10 may provide position information of the car 8 to the server, and the server may perform a function for finding a route and a function for route guidance.

The on-board terminal device 10 may be embodied by a general purpose information processing terminal, or a dedicated terminal device for navigation (which may be referred to as a PND (Portable Navigation Device)). Examples of the general purpose information processing terminal include a smartphone, a tablet terminal, a cellular phone, a PDA (Personal Digital Assistant), a laptop PC, and a wearable computer (such as a wristwatch-type wearable computer, or a glasses-like wearable computer). These general purpose information processing terminals are usually used as an information processing terminal. When an application program for navigation is executed, these general purpose information processing terminals perform functions such as route finding or route guidance, similar to a dedicated terminal device for navigation.

A device having the above mentioned functions is referred to as a navigation device. However, the on-board terminal device 10 in the present embodiment is not required to have functions specific to a navigation device, as long as the on-board terminal device 10 is configured to interact with the dialogue control server 50 using natural language, as will be described below. Thus, the on-board terminal device 10 is not limited to the navigation device.

Alternatively, the on-board terminal device 10 may be embodied by interoperation (communication) of a general purpose information processing terminal and a dedicated terminal device for navigation. An application program installed in the general purpose information processing terminal may substantially provide a function performing an interaction by a natural language communication, and the dedicated terminal device for navigation may obtain and display a screen image generated by the application program through communication. Examples of such an application program include CarPlay (registered trademark), and Android Auto (registered trademark).

As mentioned above, in a case in which the on-board terminal device 10 is embodied by interoperation of the dedicated terminal device for navigation and the general purpose information processing terminal, the dedicated terminal device for navigation may be referred to as a "Display Audio" device (or "connected audio device"). The Display Audio is a device mainly providing an AV function and a communication function, not having a navigation function.

Regardless of whether the on-board terminal device 10 is embodied by a general purpose information processing terminal or by a dedicated terminal device for navigation, the on-board terminal device 10 may be configured such that the on-board terminal device 10 can be switched between a state installed in a car and a portable state. That is, the on-board terminal device 10 may be a detachable device.

<Hardware Configuration>

Figure 4:
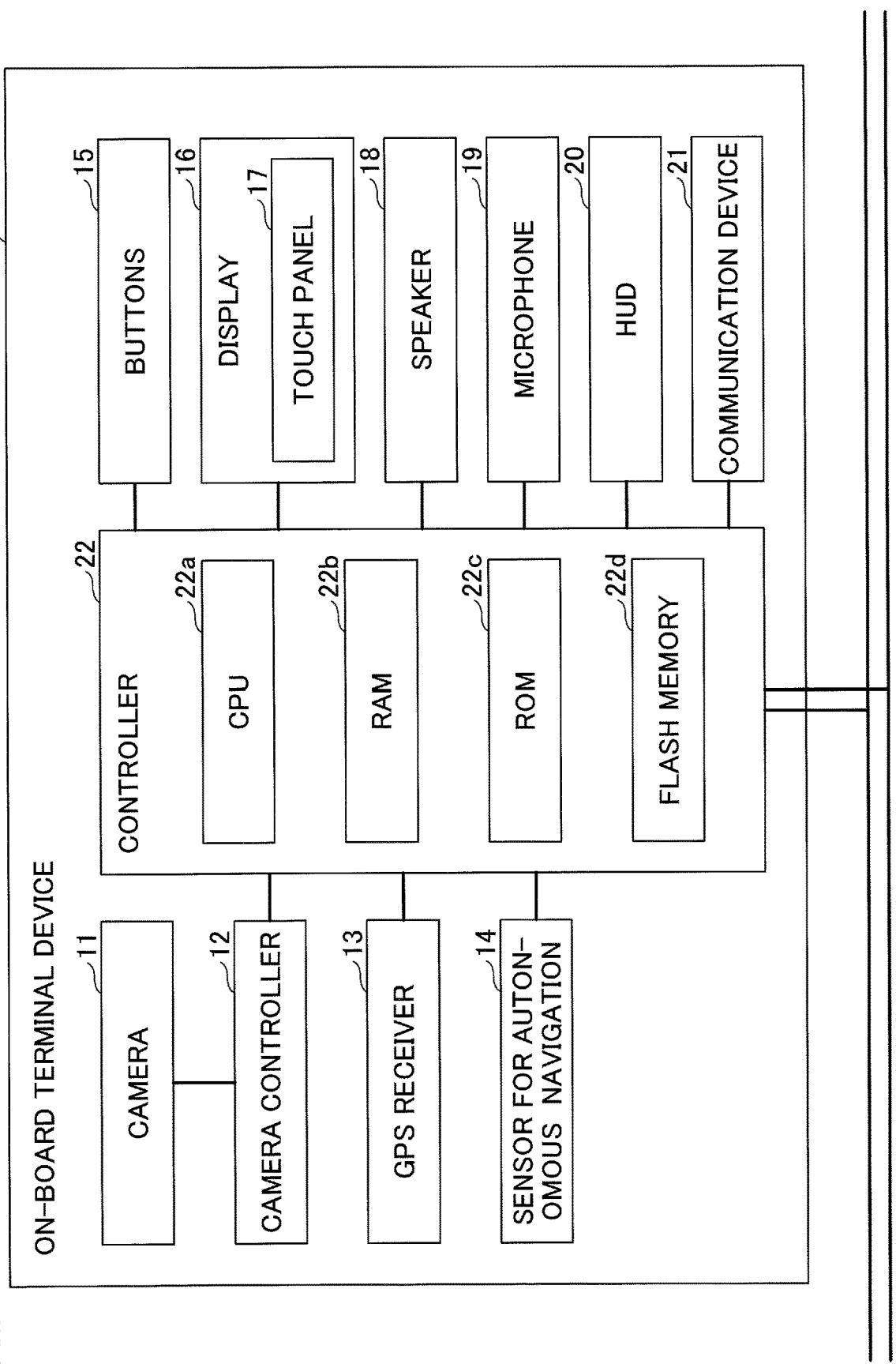
FIG. 4 is a hardware configuration diagram illustrating an example of a hardware configuration of an on-board terminal device.

FIG. 4 is a hardware configuration diagram illustrating an example of a hardware configuration of the on-board terminal device 10. The on-board terminal device 10 is controlled by a controller 22. To the controller 22, a camera controller 12 (for controlling a camera 11 and for performing image processing), a GPS receiver 13, a sensor for autonomous navigation 14, buttons 15, a display (display device) 16 with a touch panel 17, a speaker 18, a microphone 19, a head up display (HUD) 20, and a communication device 21 are connected. Although the illustrated hardware elements are for a navigation device, they are merely examples of hardware elements included in the on-board terminal device 10. Any hardware configuration may be adopted in the on-board terminal device 10 as long as the on-board terminal device 10 has functions as an information processing device.

The controller 22 is a device called a microcontroller or a computer. The controller 22 performs an overall control of the on-board terminal device 10, and performs an input of information, a processing of information, and an output of information. The controller 22 includes a CPU 22a, a RAM 22b, a ROM 22c, a flash memory 22d, and the like. The controller 22 also includes functional elements similar to those included in a generic ECU (Electronic Control Unit), such as a CAN controller, a timer, an I/O port, and the like. Further, an HDD (Hard Disk Drive) may be connected to the controller 22, in order to supplement a shortage of capacity of the flash memory 22d.

The camera 11 is an image capturing device which converts incident light into image data including brightness information by a photoelectric transducer, such as a CCD or CMOS. The camera 11 periodically transmits image data to the camera controller 12. In the present embodiment, the camera 11 is disposed, for example, on an instrument panel, so as to capture an image of a driver's face. By the camera 11 capturing an image of a driver's face, the on-board terminal device 10 can detect that the driver feels sleepy, or the communication device 21 can transmit the driver's emotional state to the dialogue control server 50. Thus, by the camera 11, various interactions in accordance with a driver's emotional state can be realized.

The camera controller 12 is an IC for applying an image processing to image data captured by the camera 11. In the present embodiment, an emotional state, sleepiness, and the like are detected by the image processing. As the camera controller 12 learns relationship between features of a face image and an emotional state or sleepiness in advance by using a machine learning algorithm such as deep learning, support vector machines, neural network, or random forest, the camera controller 12 can detect how a driver is feeling. Note that detection of feeling may be performed by the dialogue control server 50.

The GPS receiver 13 detects a position of a car using GPS satellites. The sensor for autonomous navigation 14 is a sensor such as an accelerometer, a gyrosensor, or a magnetic field sensor, for estimating a position or a driving direction of a car by autonomous navigation.

The buttons 15 are switches, buttons, touch sensors, or the like, which are frequently used by a driver. Examples of the buttons 15 include a power button, a volume-control button, and an eject button for a CD or DVD. A steering wheel control switch is also included in the examples of the buttons 15. The display 16 is a displaying device such as an LCD (Liquid Crystal Display) or an organic EL. The display 16 integrally has the touch panel 17. The touch panel 17 detects coordinates of a location where touched with the user's finger, and outputs the coordinates to the controller 22. On the display 16, an icon and options 6, which are related to a topic recognized by the natural language dialogue system 100, are displayed.

The speaker 18 outputs an answer sentence sent from the dialogue control server 50 by sound, in addition to outputting a direction of a route by sound. The microphone 19 collects sound to recognize a driver's voice. The speech recognition may be performed in both the car 8 and any server. The HUD 20 displays information on a translucent combiner provided in a driver's view (or front glass). An icon related to a topic recognized by the natural language dialogue system 100 and options 6 may be displayed on the HUD 20. The communication device 21 transmits and/or receives various types of information by communicating with the base station 9 of the telecommunications carrier.

A hardware configuration of the dialogue control server 50 is similar to that of a generic information processing apparatus. That is, the dialogue control server 50 includes a CPU, a RAM, a ROM, an HDD (Hard Disk Drive), a network card, an input device, and an output device. Because the hardware configuration of the dialogue control server 50 is generic, illustration of these hardware elements are omitted. The dialogue control server 50 may be a cloud computing environment. The dialogue control server 50 may also be referred to as other names, such as a dialogue management server, a conversation control server, or a chat server.

<Functional Configuration>

Figure 5:
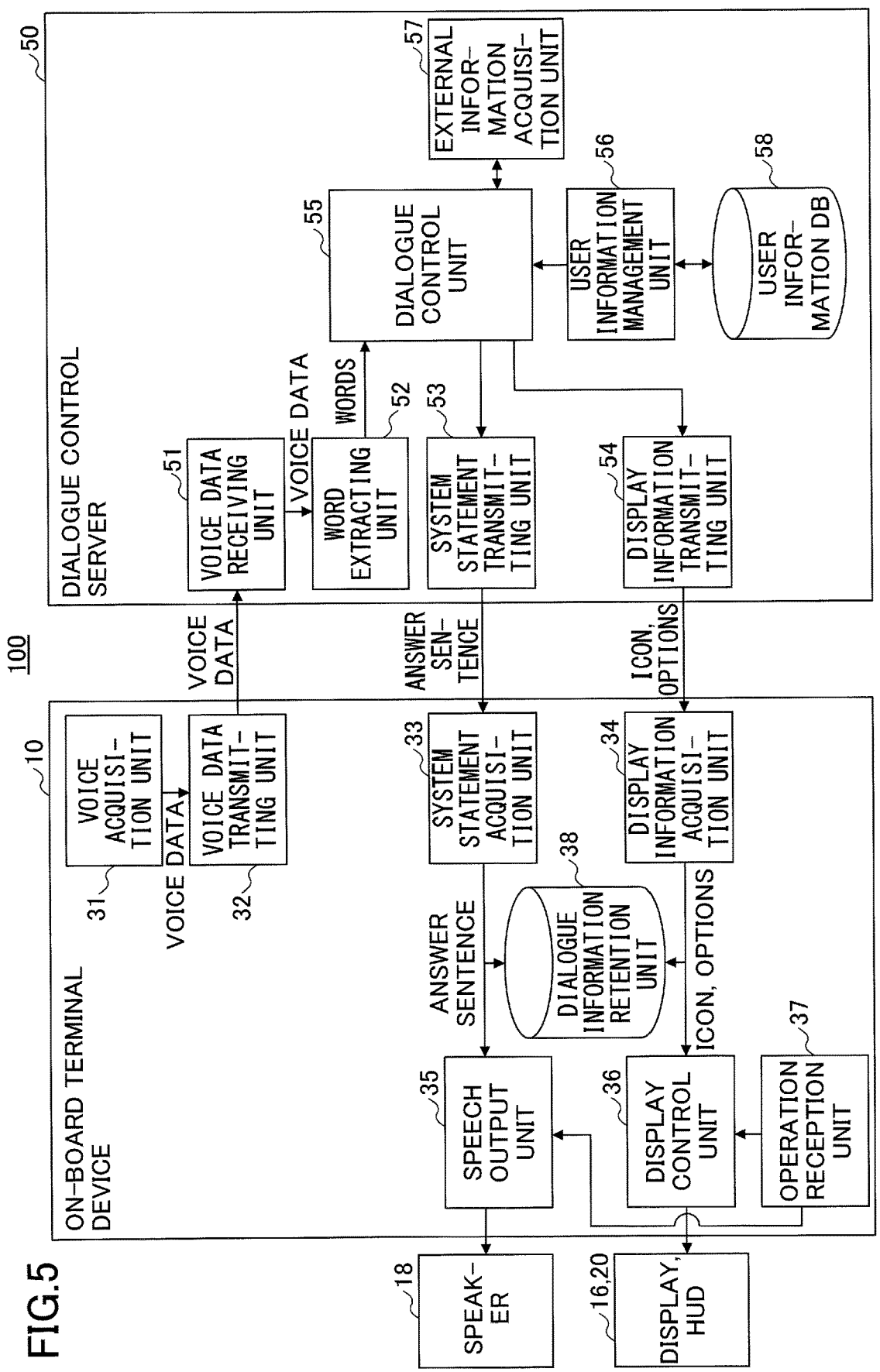
FIG. 5 is an example of a functional block diagram illustrating functions of the on-board terminal device and a dialogue control server as a block diagram.

FIG. 5 is an example of a functional block diagram illustrating functions of the on-board terminal device 10 and the dialogue control server 50 in the natural language dialogue system 100, as a block diagram.

<<On-Board Terminal Device>>

The on-board terminal device 10 includes the following functional elements: a voice acquisition unit 31, a voice data transmitting unit 32, a system statement acquisition unit 33, a display information acquisition unit 34, a speech output unit 35, a display control unit 36, an operation reception unit 37, and a dialogue information retention unit 38. These functional elements are embodied by the CPU 22a executing a program loaded into the RAM 22b from the flash memory 22d.

The voice acquisition unit 31 is turned on, for example, while the steering wheel control switch is pressed, and acquires voice collected by the microphone 19 as voice data, by converting the voice into an electrical signal. The voice data transmitting unit 32 transmits the voice data of a predetermined time (20 milliseconds, for example) acquired by the voice acquisition unit 31 to the dialogue control server 50 repeatedly. An appropriate time range for causing a speech recognition function to work effectively may be chosen as the predetermined time. A communication protocol used for transmitting the voice data is not limited to a specific one. For example, a communication protocol suitable for mobile communication may be used. Note that the on-board terminal device 10 knows an IP address of the dialogue control server 50 in advance.

The system statement acquisition unit 33 acquires an answer sentence generated by the dialogue control server 50. Every time the dialogue control server 50 generates an answer sentence, the system statement acquisition unit 33 acquires the answer sentence. Alternatively, while a driver is driving or talking in a car, the driver can suspend receiving an answer sentence. In this case, when the driver instructs to restart receiving an answer sentence, the answer sentence is received. In a case in which reception of an answer sentence is suspended, transmission of an icon is also suspended.

The speech output unit 35 outputs an answer sentence through the speaker 18. When a data format of a received answer sentence is an audio data format such as MP3 or PCM, the received answer sentence can be played back as is. In a case in which an answer sentence is transmitted to the on-board terminal device 10 as text data, speech synthesis may be performed.

The display information acquisition unit 34 acquires an icon 7 and options 6 generated by the dialogue control server 50. Additionally, the display information acquisition unit 34 can acquire detailed information about the options 6. Other cases include only the icon 7 being acquired by the display information acquisition unit 34, or only the options 6 being acquired. As the acquired information is displayed on the display 16 or the HUD 20, a driver can see the information before an answer sentence is output, while an answer sentence is output, or after an answer sentence is output. It is preferable that the answer sentence and the icon 7 (including the options 6, if the options 6 are also transmitted) are transmitted from the dialogue control server 50 almost simultaneously, but at least one of them may be transmitted slightly later because of communication delay. The dialogue control server 50 transmits a set of the information as simultaneously as possible, so that the icon 7 can be displayed in synchronization with the answer sentence. The dialogue control server 50 may preferably control transmission of the information such that, at the least, an answer sentence with respect to a certain cycle is not acquired (or displayed) by the on-board terminal device 10 before an icon 7 with respect to a previous cycle is transmitted.

An answer sentence acquired by the system statement acquisition unit 33 and a set of an icon 7, options 6 and the like acquired by the display information acquisition unit 34 are stored in the dialogue information retention unit 38 illustrated in FIG. 22. Accordingly, a driver can confirm the answer sentence or the like afterward.

The display control unit 36 displays icons 7 and options 6 on the display 16 or the HUD 20, in a chronological order (in an order of received time).

The display control unit 36 can also change a display state of a displayed icon 7 and associated objects after a long time has elapsed (for example, the display control unit 36 may change a display status of options 6 to a hidden state). Further, when an operation from a driver is received, the display control unit 36 may display detailed information about the options 6.

The operation reception unit 37 receives various operations to the on-board terminal device 10. In the present embodiment, when the operation reception unit 37 receives a tapping operation to an icon 7, the operation reception unit 37 sends a notification to the display control unit 36 or the speech output unit 35. In response to receiving the notification, the display control unit 36 can switch a display status of options between a displayed state and a hidden state, and the speech output unit 35 can output an answer sentence again. The operation reception unit 37 may also receive text input (input by typing keys) from a driver. Natural language interaction can be achieved also by text-based communication.

Dialogue information stored in the dialogue information retention unit 38 is schematically illustrated in FIG. 22. The dialogue information includes columns of a dialog ID, a user's speech, an answer sentence, an icon, options, and detailed information. The dialog ID is identification information for identifying each speech, and is assigned to each statement of a user's speech and to each answer sentence in response to the user's speech. In the user's speech column, what is spoken by a driver is stored, and what is spoken/ stated by the dialogue control server 50 is stored in the answer sentence column. In the icon column, an icon transmitted from the dialogue control server 50 is stored. Similarly, options transmitted from the dialogue control server 50 are stored in the options column. In the detailed information column, information transmitted from the dialogue control server 50, which is associated with the options 6, such as an address, telephone number, URL of a website, and the like, is stored. In a case in which what is spoken by a user (driver) is recognized by a speech recognition function in a device other than the on-board terminal device 10, such as the dialogue control server 50, text data generated by the dialogue control server 50 or the like based on voice data transmitted from the on-board terminal device 10 is sent back to the on-board terminal device 10.

To associate an icon 7 (and options) related to an answer sentence with the answer sentence, the dialogue control server 50 may assign the same identification information with the answer sentence and the related icon 7, and send them to the on-board terminal device 10. An answer sentence and an icon 7 generated within a given period may be associated with the same dialog ID.

<<Dialogue Control Server>>

The dialogue control server 50 includes the following functional elements: a voice data receiving unit 51, a word extracting unit 52, a system statement transmitting unit 53, a display information transmitting unit 54, a dialogue control unit 55, a user information management unit 56, an external information acquisition unit 57, and a user information DB 58. These functional elements are embodied by a CPU in the dialogue control server 50 executing a program, to interoperate with hardware elements in the dialogue control server 50.

The voice data receiving unit 51 receives voice data from the on-board terminal device 10. The voice data receiving unit 51 sequentially sends the received voice data to the word extracting unit 52. The voice data is converted to a sequence of words. In a case in which the voice data is converted on a letter-by-letter basis, text data is output. In this case, words (stand-alone words) are extracted with morphological analysis. The word extracting unit 52 transmits driver's speech as user's speech to the on-board terminal device 10 via the system statement transmitting unit 53. The sequence of words is also sent to the dialogue control unit 55, and based on the sequence of words, the dialogue control unit 55 controls a conversation.

As a method of extracting words performed in the word extracting unit 52, any conventional method may be adopted. Here, an overview of a process of extracting words will be described. The word extracting unit 52 converts voice data into a sequence of words. The word extracting unit 52 performs a pre-processing for facilitating feature extraction, a feature extraction processing for extracting a feature, and an identification processing for converting voice data into phonemes. In another embodiment, a speech recognition server other than the dialogue control server 50 may perform word extraction (speech recognition), and the dialogue control server 50 may receive a sequence of words, which is a converted result, from the speech recognition server. Alternatively, a speech recognition function may be installed in the car 8. In this case, the dialogue control server 50 is not required to have the word extracting unit 52.

The system statement transmitting unit 53 transmits an answer sentence generated by the dialogue control unit 55 to the on-board terminal device 10. The display information transmitting unit 54 transmits an icon 7 and options 6 generated by the dialogue control unit 55 to the on-board terminal device 10.

The user information management unit 56 manages information of a user in the user information DB 58. When the user information management unit 56 receives an inquiry from the dialogue control unit 55, the user information management unit 56 responds to the dialogue control unit 55 based on the information of a user. Accordingly, the dialogue control unit 55 can make appropriate conversation for each user. The external information acquisition unit 57 performs an internet search, retrieves information from a given server through APIs (Application Programming Interfaces) of the server, and the like.

TABLE 1

| | |
|---|---|
| SEX | Male |
| BIRTH DATE | MM/DD/YYYY |
| FAVORITE AREAS | Seaside, skyscrapers |
| FAVORITE FOOD | Italian |
| FAVORITE NEWS TOPIC | Economics |
| HOBBIES | Movies, pottery |
| SCHEDULE | Nov. 5, 2017 12:00-conference |
| | Nov. 12, 2017 10:00-visit A Corp. |
| | . . . |
| LINK WITH PARTNER? | Yes |

Information stored in the user information DB 58 is schematically illustrated in Table 1. For example, the user information DB 58 includes attributes of a user, such as sex, a birth date, a favorite area, favorite food, a favorite news topic, and a hobby. Accordingly, the dialogue control unit 55 can output an answer sentence that is fit for attributes of a user. Also, a schedule of a user is registered with the user information DB 58, or the user information DB 58 can interoperate with an external schedule management site. Accordingly, the dialogue control unit 55 can output an answer sentence considering a schedule of a user. Further, information indicating "Yes" or "No" with respect to "link with partner?" is also registered with the user information DB 58. The item of "Link with partner?" indicates whether or not a schedule of a driver's partner (e.g. a spouse) is considered when an answer sentence is generated. Note that a schedule of a driver's partner is also registered with the user information DB 58 in a case in which the item of "Link with partner?" is "Yes". Even when the item of "Link with partner?" is not present in the user information DB 58, if a driver shares a schedule with the driver's partner, the dialogue control unit 55 may determine that an answer sentence should be generated considering the schedule of the driver's partner. Alternatively, a schedule of a person other than a driver's partner, such as a driver's friend, may be considered.

<Functions of Dialogue Control Unit>

Figure 6:
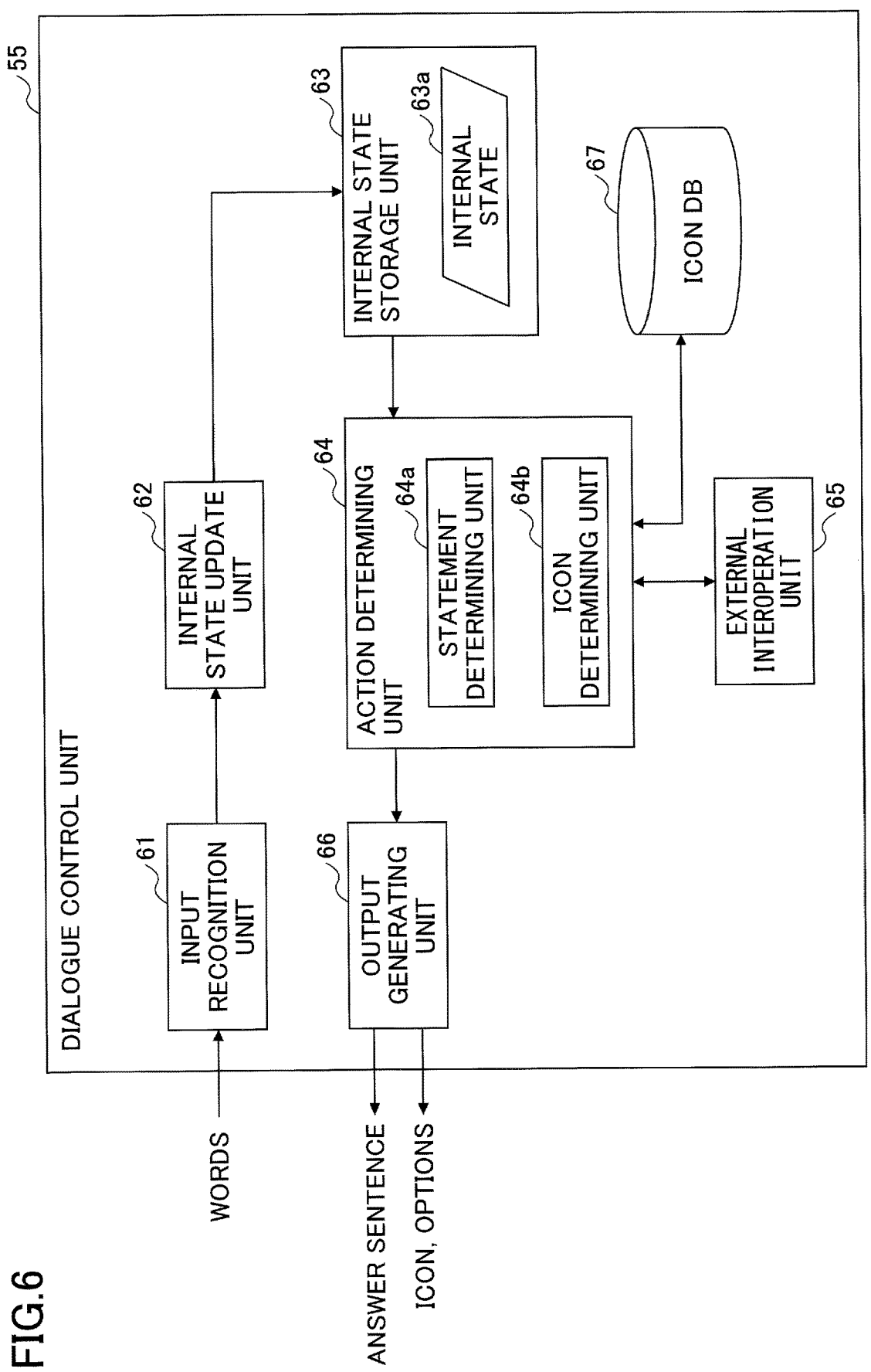
FIG. 6 is an example of a functional block diagram illustrating functions of a dialogue control unit as a block diagram.

Next, functions of the dialogue control unit 55 will be described with reference to FIG. 6. FIG. 6 is an example of a functional block diagram illustrating functions of the dialogue control unit 55 as a block diagram. As the dialogue control unit 55 is embodied by AI (Artificial Intelligence) in most cases, the following description is merely an example of generating an answer sentence. For example, an answer sentence is generated in accordance with a learning result of past speech contents of a driver.

The dialogue control unit 55 includes the following functional elements: an input recognition unit 61, an internal state update unit 62, an internal state storage unit 63, an action determining unit 64, an external interoperation unit 65, an output generating unit 66, and an icon DB 67. Each of the functional elements in FIG. 6 will be described below, with reference to FIG. 7 or FIG. 8 when necessary.

The input recognition unit 61 converts input words, gestures, or image data into data representation that can be treated by a computer. In the present embodiment, a case in which a sequence of words is input is mainly described. However, gesture or image data may be entered. The input recognition unit 61 determines intent of a speech, based on a sequence of words. As an example of technology enabling input recognition, FST (Finite State Transducer) is known.

Figure 7:
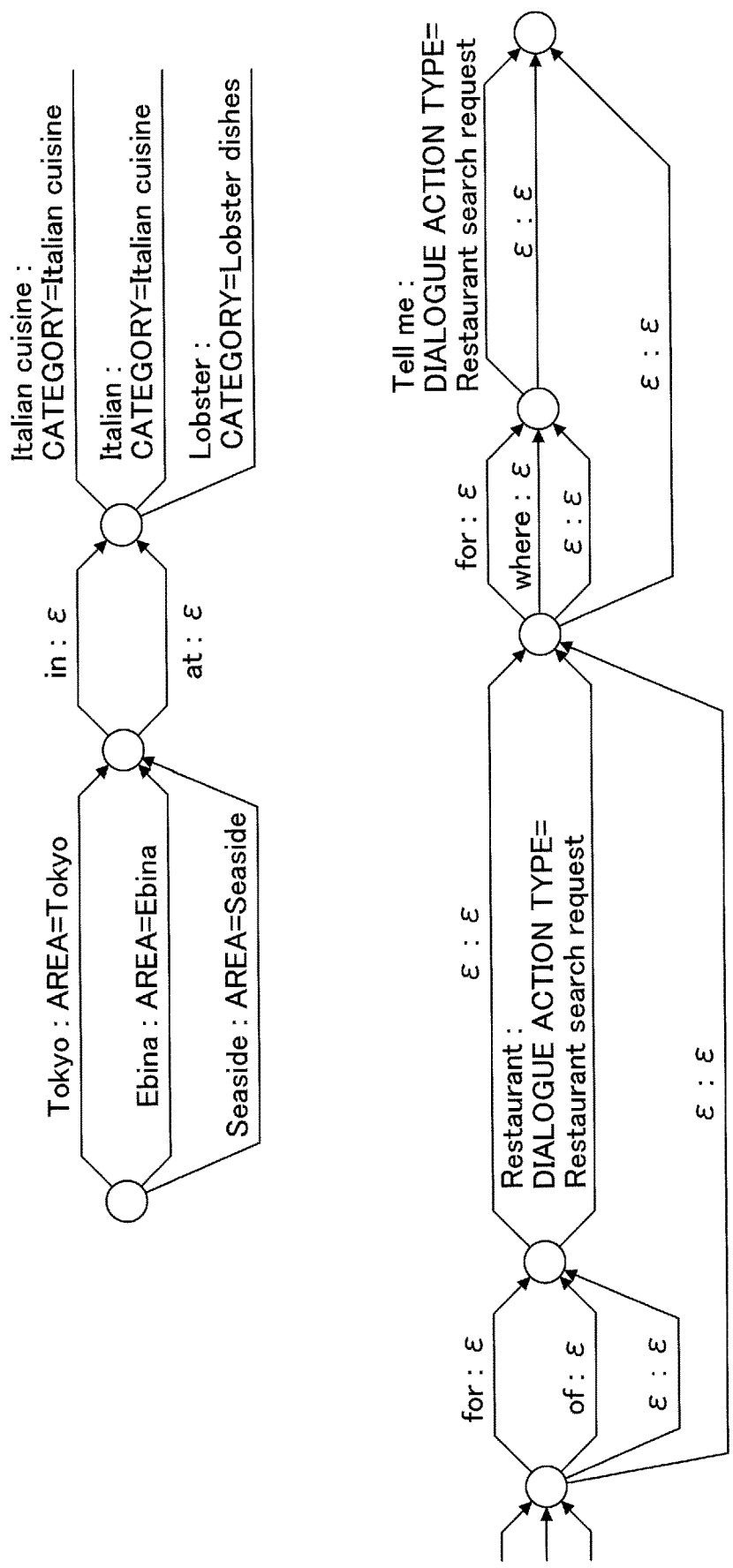
FIG. 7 is an example of a diagram illustrating input recognition by FST (Finite State Transducer)

FIG. 7 is an example of a diagram illustrating input recognition by the FST. FIG. 7 illustrates a case of input recognition regarding a dialogue act of a restaurant search request. In the FST, a path whose input label is the same as a word in an input sequence of words is followed sequentially from an initial state, and when reached at the last state, an object made by joining output labels of the followed paths is output. In FIG. 7, what is described at the left side of ":" on each path is an input label and what is described at the right side of ":" on each path is an output label. "ε" represents the empty set, which means that an input label or an output label is omitted.

When a sequence of words of "tell me an Italian restaurant in Tokyo" is input, the FST outputs the output labels that are placed at the right side of the input labels matching with a word in the sequence of words. Thus, "AREA=Tokyo, CATEGORY=Italian cuisine, DIALOGUE ACTION TYPE=Restaurant search request" is obtained. If only a word "restaurant" is input, "DIALOGUE ACTION TYPE=Restaurant search request" is obtained. When the "DIALOGUE ACTION TYPE" is determined, dialogue management becomes possible.

The internal state update unit 62 updates an internal state 63a, in accordance with a result of the input recognition. In the internal state 63a, any type of information may be contained regarding a dialogue act. However, type of information retained in the internal state 63a depends on design of the dialogue control unit 55. For example, a dialogue history between a driver and the natural language dialogue system 100, a result of intent recognition in a frame (to be illustrated in FIG. 8) determined by a dialogue act type (dialogue action type), an access result when the external interoperation unit 65 has made a communication with an external device, speech obligation indicating which of a driver and the natural language dialogue system 100 should speak (respond), a current location, and the like, are retained in the internal state 63a.

Figure 8:
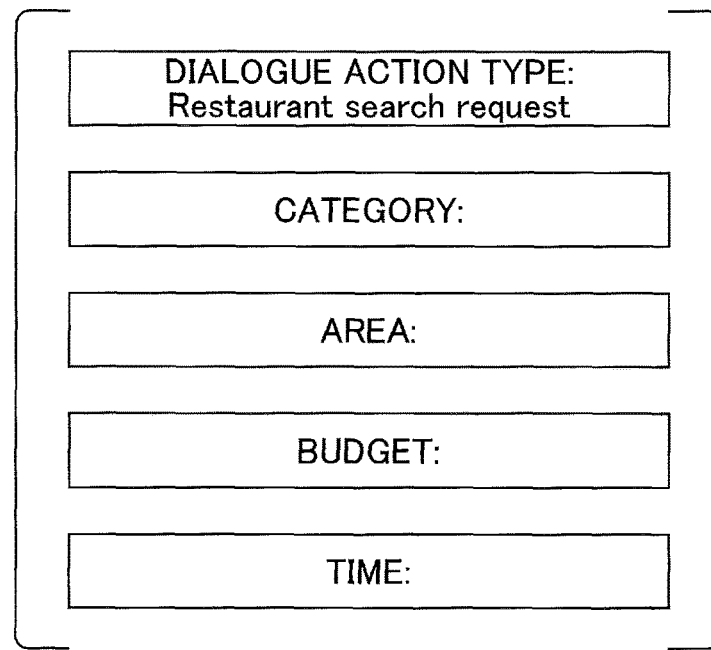
FIG. 8 illustrates an example of a result of intent recognition which is represented by using a data structure called a frame.

An example of a result of the intent recognition is illustrated in FIG. 8, which is represented by using a data structure called a frame 70. The internal state update unit 62 manages a conversation using the frame which is sets of a symbol and its attribute. That is, the internal state update unit 62 updates the attribute of the symbol managed by the frame, in accordance with a progress of the conversation. In FIG. 8, a text string described at the left side of ":" represents a symbol and a text string described at the right side of ":" represents an attribute. The frame 70 is sets of a symbol and an attribute with respect to one dialogue act. When attributes of all symbols in a frame are determined, it means that a dialogue act corresponding to the frame is completed. Note that a method of intent recognition described above is merely an example. Thus, a probabilistic model such as Bayesian network may be used.

The action determining unit 64 determines what type of action the natural language dialogue system 100 should take, by referring to the internal state 63a. The action determining unit 64 includes a statement determining unit 64a and an icon determining unit 64b. The statement determining unit 64a constructs an answer sentence based on the internal state 63a, attributes of a user, a search result, and the like. When constructing the answer sentence, AI may be used when necessary. The icon determining unit 64b determines an icon, based on a topic determined by the answer sentence. For example, with respect to a dialogue act of a restaurant search request, the statement determining unit 64a constructs an answer sentence to fill the contents in the frame 70 as illustrated in FIG. 8. That is, the statement determining unit 64a extracts a symbol of which a corresponding attribute has not been determined, and instructs to make a statement of "In which area would you like to find a restaurant?", for example.

The statement determining unit 64a can also make a "smart move", by referring to the user information DB 58 of a driver via the external interoperation unit 65. For example, if the item of "Link with partner?" is "Yes" (or if a schedule of a driver is shared with the driver's partner), the action determining unit 64 can find a period of time in which both the driver and the driver's partner are free. Alternatively, the action determining unit 64 can find a restaurant considering attributes (such as a hobby or food preference) of the partner.

Further, if a favorite food or area, a hobby, or the like, is registered with the user information DB 58, the statement determining unit 64a can output a search result of restaurants of a category that a driver likes, even when an attribute of a symbol "category" is not determined in the frame 70.

When attributes of all symbols in the frame 70 are determined, or when a search is possible based on information of a driver, the statement determining unit 64a passes the information retained in the frame 70 to the external interoperation unit 65, and instructs to perform search. The information retained in the frame 70 is, for example, a search condition of a restaurant. Thus, by using the information, the external information acquisition unit 57 can acquire information of restaurants, and the statement determining unit 64a can provide the information of the restaurants.

The icon determining unit 64b determines an icon 7 and options 6 based on an answer sentence. The icon determining unit 64b can refer to the icon DB 67. In the icon DB 67, icons each associated with a corresponding word are registered.

The output generating unit 66 transmits the answer sentence, the icon 7, and the options 6, which are constructed by the action determining unit 64, to the on-board terminal device 10. By the output generating unit 66, for example, an answer sentence of "I recommend a seaside restaurant serving delicious lobster", an icon of a restaurant, names of three restaurants, and detailed information of the restaurants are transmitted.

The output generating unit 66 may perform speech synthesis to output an answer sentence. A method of the speech synthesis is not limited to a specific one. For example, the output generating unit 66 analyzes a text string to convert the text string into pronunciation, and determines an appropriate accent of each word and a pause. Next, by referring to a database in which voice waveform data of each pronunciation is registered, the output generating unit 66 selects pieces of the voice waveform data corresponding to the words in the text string, in an order of the words in the text string. Further, the output generating unit 66 adjusts the selected voice waveform data so that each of the selected voice waveform is smoothly pronounced. The speech synthesis may be performed by the car 8.

An example of correspondence between words and icons registered in the icon DB 67 is illustrated in FIG. 23. Each icon registered in the icon DB 67 is associated with a corresponding word. Thus, the icon determining unit 64b can determine an icon associated with a word contained in an answer sentence. If a word contained in an answer sentence is not registered with the icon DB 67, the action determining unit 64 can retrieve an icon corresponding to the word on the Internet via the external interoperation unit 65. Note that the icons illustrated in FIG. 23 are merely examples.

<Constructing Answer Sentence and Choosing Icon>

The statement determining unit 64a constructs an answer sentence for asking a driver for confirmation or for providing a search result. The constructing method is not limited to a specific one. For example, formats of answer sentences are prepared in advance, and the statement determining unit 64a may apply a word or a search result to one of the formats. Specifically, when constructing an answer sentence in response to a restaurant search request, formats such as "X popular restaurants are found" and "I recommend a Y restaurant serving delicious Z" are prepared in advance. The statement determining unit 64a may apply information obtained by a search operation or a word used in the search operation to the above X, Y, or Z. In the above example, a number is applied to X, a word concerning an area that has been obtained from a user attribute or user's speech is applied to Y, and a word concerning a type of meal that has been used for the search operation is applied to Z.

For example, when a driver speaks "lobster", the statement determining unit 64a obtains, from an attribute of the driver, "seaside" as area information, and the statement determining unit 64a searches for a restaurant related to a lobster and a seaside, Y is "seaside" and Z is "lobster". As described above, if a meaning of a word is known, an answer sentence can be constructed by using an appropriate format.

Next, a method of choosing an icon will be described. The icon determining unit 64b chooses an icon based on the following rules:

(i) all of the stand-alone words (categorematic words) contained in an answer sentence (ii) a word which a user has not spoken in the past (iii) an attribute in the frame 70 of which a user has not spoken Words corresponding to the rule (i) (all words contained in an answer sentence) include words corresponding to the rule (ii) or (iii). Also, words corresponding to the rule (ii) (a word which a user has not spoken in the past) include words corresponding to the rule (iii). The natural language dialogue system 100 according to the present embodiment displays an icon related to a recognized topic. The function can be satisfied by the rule (i). Further, by performing the rules (ii) and (iii), the natural language dialogue system 100 can display an icon regarding a topic that a driver is not expecting or that a driver has not considered, and can ask a driver for confirmation of the topic. The rule (ii) can be performed by referring to the dialogue history in the internal state 63a. Also, by referring to the dialogue history in the internal state 63a, whether or not an attribute in the frame 70 is included in a driver's speech (what is spoken by a driver) can be checked. Thus, the rule (iii) can also be performed. By choosing an icon based on the above described rules, an icon related to a word, which is not expected or considered by a driver and which is needed to ask the driver for confirmation, can be provided.

Figure 9:
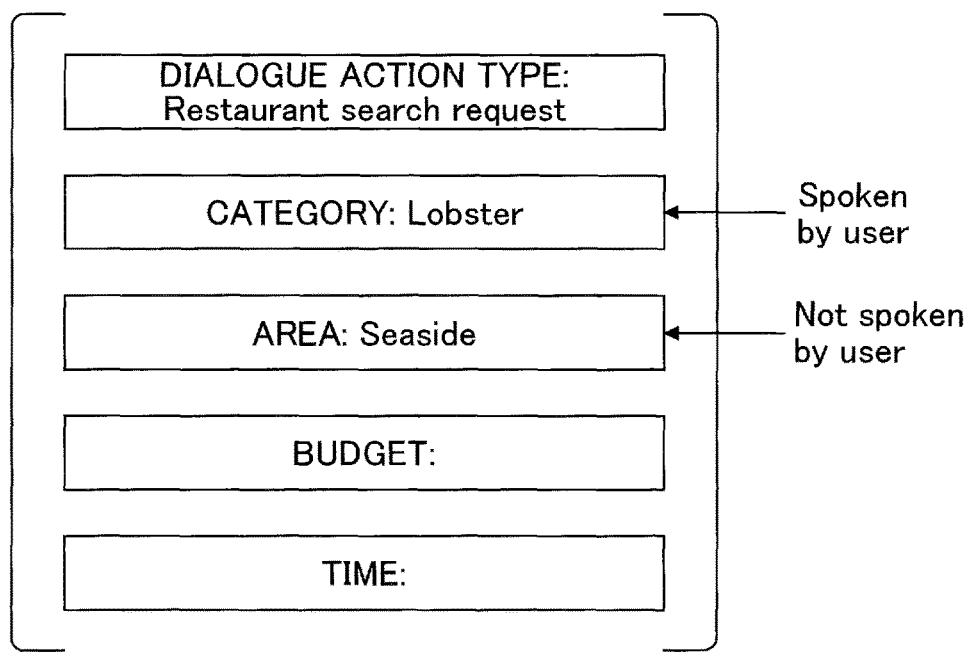
FIG. 9 illustrates an example of the frame used for explaining determination of a user's speech.

An example of determination of a user's speech is explained with reference to the frame 70 illustrated in FIG. 9. In this example, there is detection of a word "seaside" not having been spoken by a user.

With respect to the number of icons selected based on the rules (i) to (iii), there is a relation of "(i)>(ii)>(iii)". When the number of displayed icons is small, it means that an amount of information provided is also small. As the appropriate number of icons depends on a driver, the natural language dialogue system 100 may be configured such that a driver can choose a preferred rule among (i) to (iii). In addition, an upper limit of the number of icons to be displayed may be configurable by a driver, regardless of which rule of (i) to (iii) is being chosen by the icon determining unit 64b. When limiting the number of icons to be displayed, display priority may be set in an order of (iii)>(ii)>(i). By setting the display priority as described above, a word corresponding to an attribute of a symbol in the frame 70 which has not been spoken by a user, or a word not having been spoken by a user in the past, is likely to be displayed as an icon 7.

<Operating Procedure>

Figure 10:
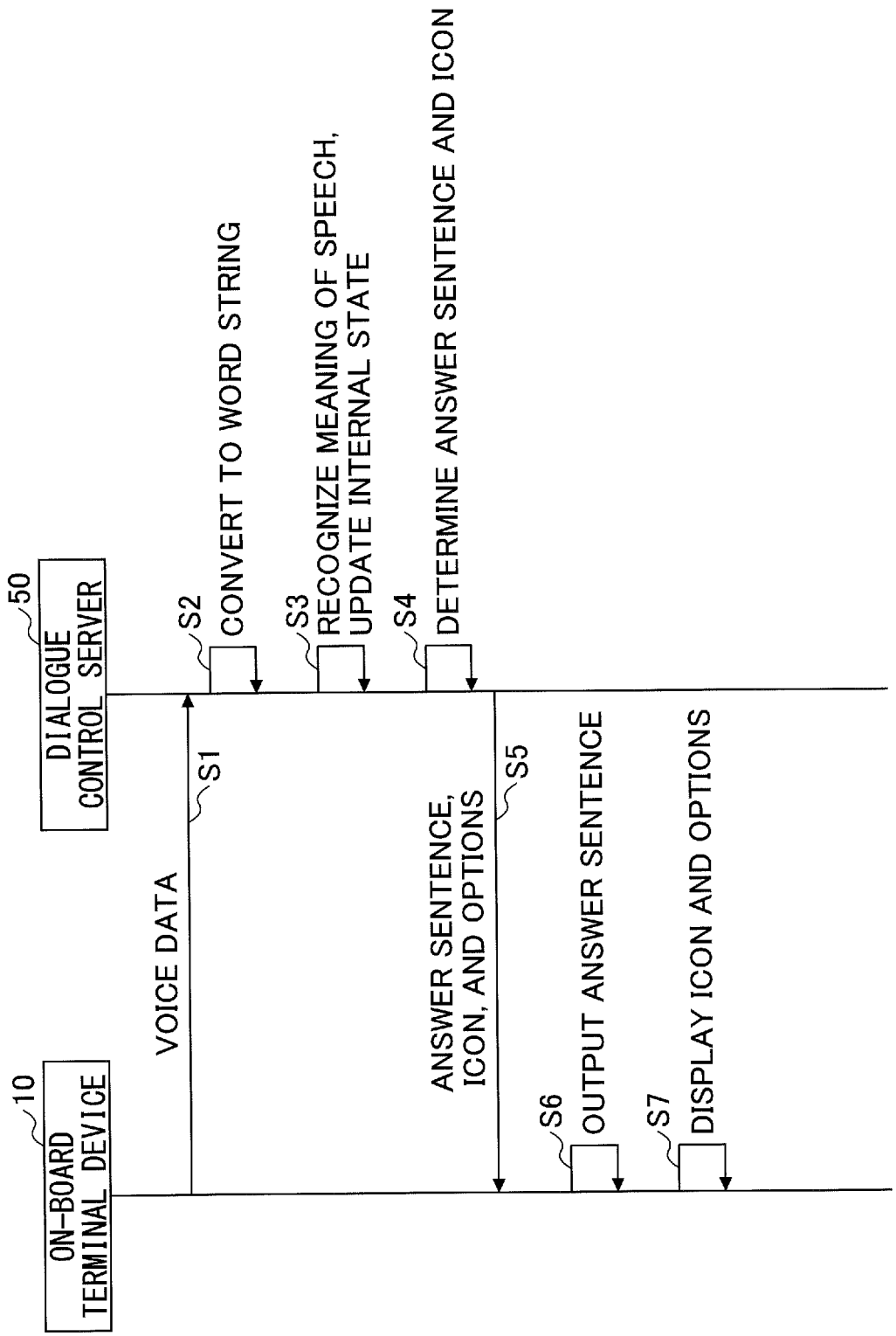
FIG. 10 is a sequence diagram of an example of a flow of operations when the natural language dialogue system displays an icon based on voice data.

FIG. 10 is a sequence diagram of an example of a flow of operations when the natural language dialogue system 100 displays the icon 7 based on voice data.

S1: The voice acquisition unit 31 in the on-board terminal device 10 acquires driver's speech (voice) and converts the voice into voice data. Next, the voice data transmitting unit 32 transmits the voice data to the dialogue control server 50.

S2: The voice data receiving unit 51 in the dialogue control server 50 receives the voice data, and the word extracting unit 52 performs speech recognition with respect to the voice data and converts the voice data into one or more words (a sequence of words).

S3: The input recognition unit 61 in the dialogue control unit 55 determines intent of the speech based on the sequence of words, and the internal state update unit 62 updates the internal state 63a. Specifically, the input recognition unit 61 determines a dialogue act type such as a restaurant search request, and sets an attribute to a symbol of the dialogue act type.

S4: The statement determining unit 64a identifies a symbol of which a corresponding attribute has not been determined, and constructs an answer sentence for inquiring of an attribute of the symbol. In addition, the statement determining unit 64a may construct other types of answer sentences, such as an answer sentence for confirming what the driver has said. Also, the icon determining unit 64b converts a topic included in the answer sentence into an icon 7. Details of the conversion will be described below with reference to FIG. 11. The output generating unit 66 outputs the answer sentence and the icon 7. When a search result has been obtained, the icon determining unit 64b determines options 6 based on a predetermined criterion. For example, top three search results, three places in order of proximity from a current position, three events in sequential order from a current time, position, or the like, may be determined.

S5: The system statement transmitting unit 53 transmits the answer sentence to the on-board terminal device 10, and the display information transmitting unit 54 transmits the icon 7 to the on-board terminal device 10. If options 6 have been determined, the options 6 are also transmitted. Note that a case in which an icon 7 is not generated may occur.

S6: In the on-board terminal device 10, the system statement acquisition unit 33 acquires the answer sentence, and the display information acquisition unit 34 receives the icon 7 and the options 6. The speech output unit 35 outputs the answer sentence through the speaker 18.

S7: The display control unit 36 displays the icon 7 and the options 6 in accordance with a predetermined format. For example, the icon 7 is displayed at a head of the options 6, and sequential numbers, such as 1, 2, 3 . . . , are attached to each of the options 6. Note that steps S6 and S7 may be executed in arbitrary order.

Figure 11:
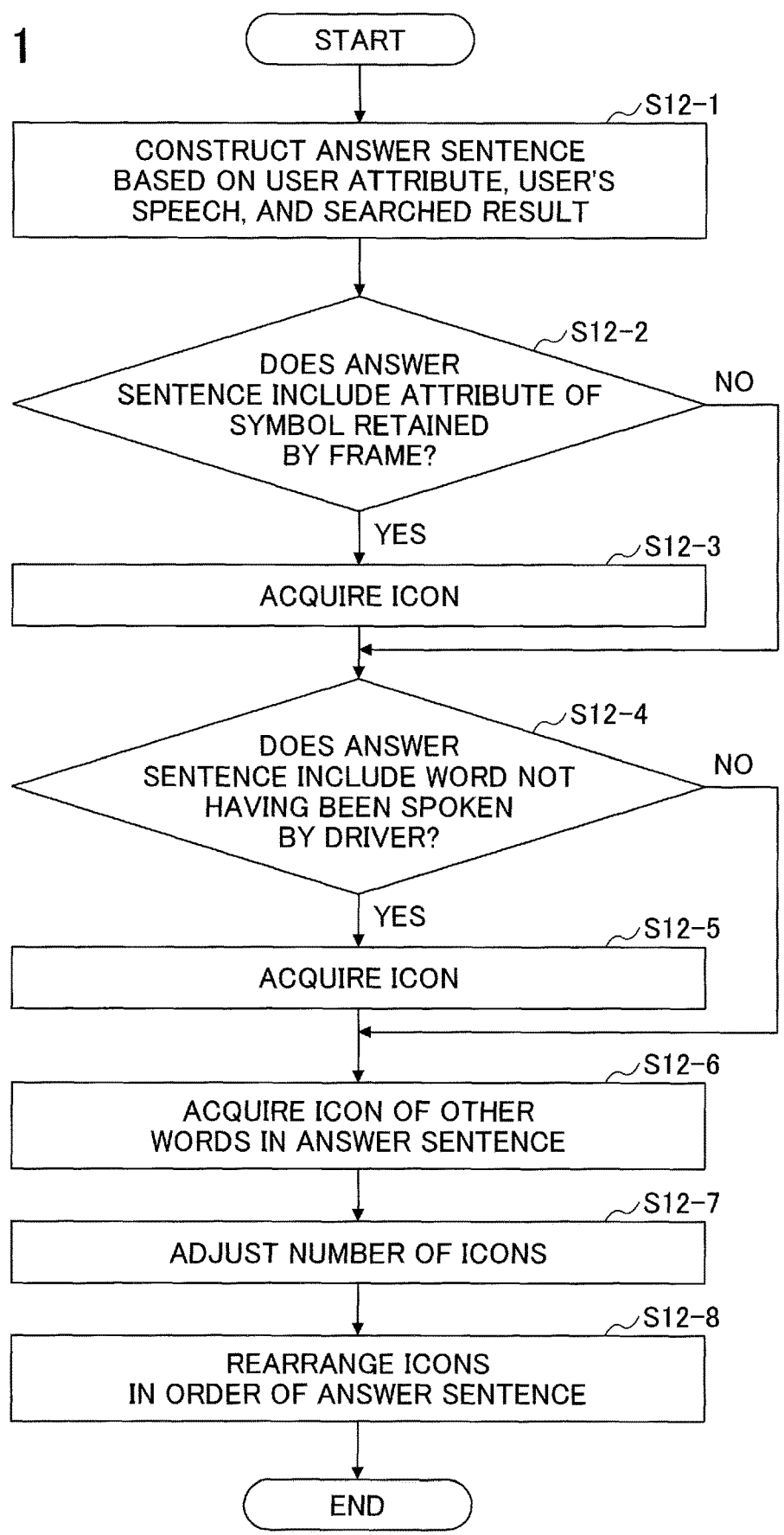
FIG. 11 is a flowchart illustrating an example of a flow of operations when an icon determining unit determines an icon.

FIG. 11 is a flowchart illustrating an example of a flow of operations when the icon determining unit 64*b* determines an icon 7.

The statement determining unit 64*a* constructs an answer sentence, using an attribute of a user (driver), contents of a user's speech, and a result of search performed based on the attribute of the user and the contents of the user's speech (S12-1).

Next, the statement determining unit 64*a* determines if the answer sentence includes an attribute of a symbol in the frame 70 of which the user has not spoken (S12-2). In the internal state 63*a*, contents (dialogue history) of which the driver (user) has spoken is recorded. By checking if the attribute of the symbol in the frame 70 is included in the dialogue history, the statement determining unit 64*a* can detect the attribute of the symbol of which the driver (user) has not spoken. An attribute of the frame 70 is important because an attribute is referenced for proceeding with the dialogue and for performing search. In the present embodiment, as an attribute not spoken by a driver is displayed as an icon 7, the driver can recognize a topic that is unexpected for the driver by seeing an icon.

Next, the icon determining unit 64*b* acquires an icon 7 from the icon DB 67 associated with the attribute detected at step S12-2 (S12-3).

The icon determining unit 64*b* determines whether or not the answer sentence includes a word that has not been spoken by the driver in the past (S12-4). Specifically, by comparing the dialogue history in the internal state 63*a* with the answer sentence, the icon determining unit 64*b* identifies a word which is present in the answer sentence but which is not present in the dialogue history.

The icon determining unit 64*b* acquires an icon 7 from the icon DB 67 associated with the word identified at step S12-4 (S12-5).

Next, the icon determining unit 64*b* acquires an icon 7 associated with other words (S12-6). Note that "other words" mentioned here mean words (such as stand-alone words) other than the words detected at steps S12-2 and S12-4.

The action determining unit 64 adjusts the number of the icons 7 to be displayed associated with the answer sentence (S12-7). As an excessive number of displayed icons 7 hinders the driver's understanding, the number of the icons 7 to be displayed is adjusted to be not more than an upper limit. The display priority of the icons 7 is as described above. Note that the adjustment of the number of the icons 7 is not mandatory. Also, the natural language dialogue system 100 may be configured such that the driver can determine whether or not the number of the icons 7 is to be adjusted, or the driver can determine the upper limit.

Next, the action determining unit 64 sorts the icons 7 in an order of words in the answer sentence (S12-8). Accordingly, as the display order of the icons 7 becomes the same as the order of words in the answer sentence, the driver can understand the answer sentence easily. With respect to a word in an answer sentence associated with the icon 7, the statement determining unit 64*a* may attach information indicating that the word is associated with the icon 7 when sending the answer sentence to the on-board terminal device 10, because it is effective to output the answer sentence in an understandable manner. By sending such information to the on-board terminal device 10, as the speech output unit 35 can output the answer sentence by emphasizing the word associated with the icon 7, the driver can easily understand a relation between the answer sentence and the icon 7. The "emphasizing the word" means, for example, the following output methods: outputting the word in a larger volume, outputting the word by changing a wavelength of the word, or inserting a pause before and/or after the word. Alternatively, in a case in which the display control unit 36 is configured to be able to display the answer sentence on the display 16 or the HUD 20, the display control unit 36 can display the word associated with the icon 7 noticeably. For example, the word associated with the icon 7 may be displayed by changing at least one of color, thickness, and a font of the words.

In the following, examples of icons 7 displayed in accordance with conversation between a driver and the dialogue control server 50 will be described, by introducing several use cases.

<Use Case 1>

Figure 12:
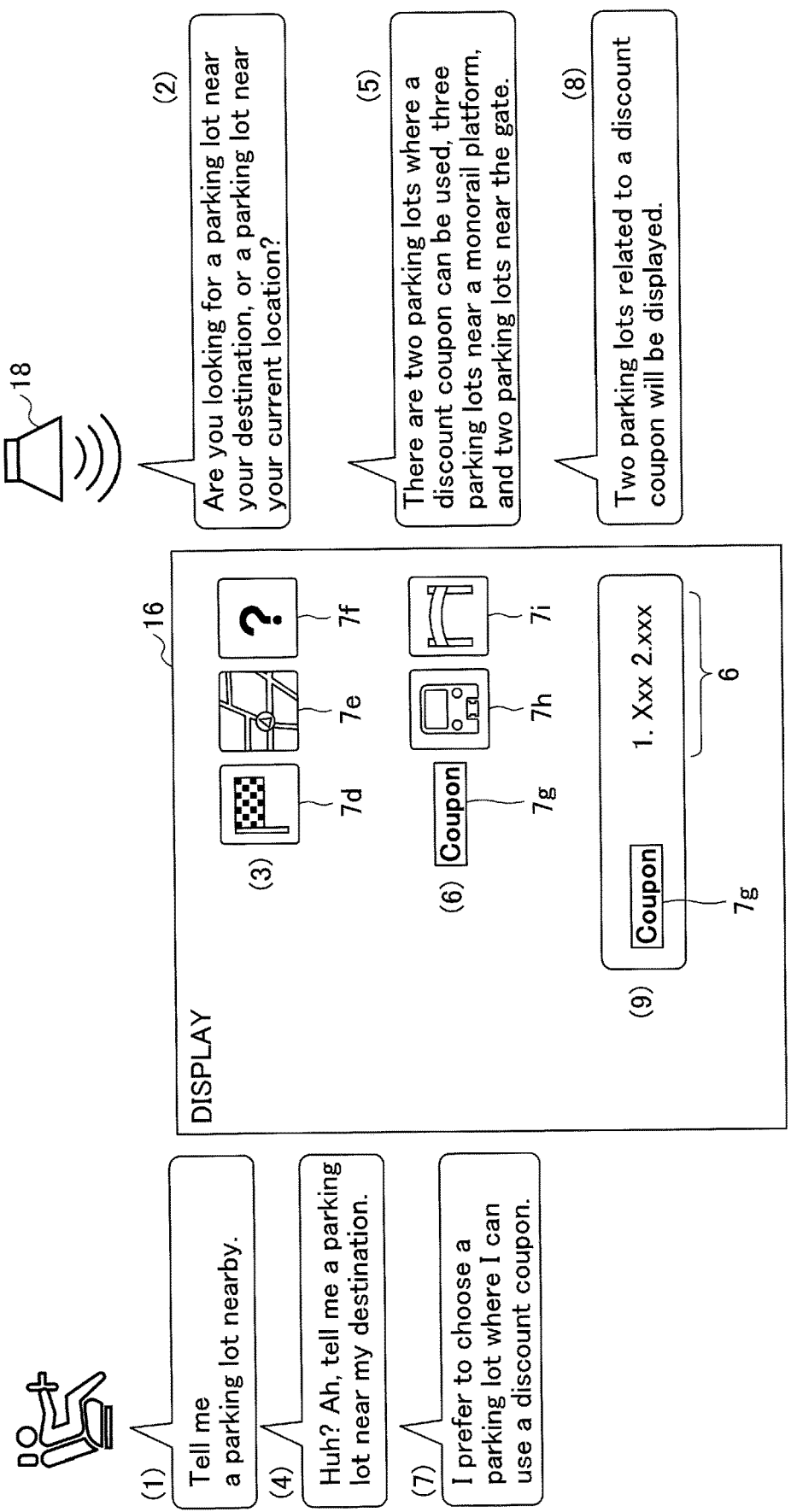
FIG. 12 is a diagram illustrating an example of answers presented by the natural language dialogue system.

FIG. 12 is a diagram illustrating an example of answers presented by the natural language dialogue system 100 according to the present embodiment.

(1) A driver speaks "Tell me a parking lot nearby".

(2) The input recognition unit 61 in the dialogue control server 50 recognizes a meaning of this speech, and determines that a parking search request was issued. However, because no information about an area has been spoken, the input recognition unit 61 determines that an essential attribute of a symbol has not been provided. Thus, the statement determining unit 64*a* in the dialogue control unit 55 speaks "Are you looking for a parking lot near your destination, or a parking lot near your current location?"

(3) In an answer sentence, the icon determining unit 64*b* identifies a word related to an area in a frame 70 and not having been spoken by the driver. Specifically, the icon determining unit 64*b* identifies "near your destination" and "near your current location" in the answer sentence of "Are you looking for a parking lot near your destination, or a parking lot near your current location?", and displays icons 7*d* and 7*e* representing "near your destination" and "near your current location" respectively, and displays an icon 7*f* representing an interrogative sentence. By displaying the icon 7*f* representing an interrogative sentence, the natural language dialogue system 100 can encourage the driver to answer.

(4) The driver determines that the driver himself/herself needs to specify an area to be searched, based on at least one of the answer sentence and the icon(s) 7, and speaks "Huh? Ah, tell me a parking lot near my destination".

(5) The input recognition unit 61 recognizes that "near destination" is specified, and determines that the area to be searched is near the destination. Next, the action determining unit 64 causes the external information acquisition unit 57 to find a parking lot in the vicinity of the destination. By the above operations being performed, multiple parking lots are found. The action determining unit 64 may propose options 6 at this point. However, in this use case, because the number of searched results is large, the action determining unit 64 determines that the action determining unit 64 should request the driver to narrow candidates to be displayed. The statement determining unit 64a speaks of features of the parking lots. As an example, the statement determining unit 64a constructs an answer sentence of "There are two parking lots at which a discount coupon can be used, three parking lots near a monorail platform, and two parking lots near the gate". The answer sentence is sent to the on-board terminal device 10, and is output through the speaker 18.

(6) Further, as words not having been spoken by the driver in the past, the icon determining unit 64b identifies "discount coupon", "monorail platform", and "gate", and obtains an icon 7g representing a discount coupon, an icon 7h representing a monorail, and an icon 7i representing a gate, from the icon DB 67. The icons 7 are sent to the on-board terminal device 10, and are displayed on the display 16.

(7) Based on at least one of the answer sentence and the icons 7, the driver determines his/her preferred parking lot, and speaks "I prefer to choose a parking lot where I can use a discount coupon".

(8) Based on the driver's speech, the input recognition unit 61 in the dialogue control server 50 determines that a type of a parking lot related to a discount coupon was selected, and the statement determining unit 64a constructs an answer sentence of "Two parking lots related to a discount coupon will be displayed".

(9) The icon determining unit 64b obtains an icon 7g representing words (stand-alone words) of "discount coupon" contained in the answer sentence, from the icon DB 67. The icon determining unit 64b also sets information of the parking lots accepting a discount ticket to the options 6. Thus, the icon 7g representing a discount ticket and the options 6 are displayed on the display 16 of the on-board terminal device 10. By tapping a parking lot in the options 6, the driver can display detailed information of the parking lot.

<Use Case 2>

Figure 13:
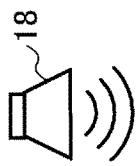
FIG. 13 is a diagram illustrating an example of answers presented by the natural language dialogue system.

FIG. 13 is a diagram illustrating an example of answers presented by the natural language dialogue system 100 according to the present embodiment.

(1) A driver speaks "Tell me concert information being held soon".

(2) Based on the driver's speech, the input recognition unit 61 in the dialogue control server 50 determines that a concert search request was issued. The statement determining unit 64a causes the external information acquisition unit 57, via the external interoperation unit 65, to find a concert that will be held shortly during a free time of the driver on his/her schedule and that will be held in an area of the driver's normal activity. As a result of the search, event date information of concerts is retrieved, and the statement determining unit 64a constructs an answer sentence of "Three rock concerts and two classical music concerts will be held in spare time on your calendar". In addition, based on certain information, such as a user attribute, the information that the schedule is shared by the driver and the driver's wife, and an activity history of the driver that the driver has been to a concert with the driver's wife, the statement determining unit 64a constructs an answer sentence of "Would you like to go with your wife?" The answer sentence is sent to the on-board terminal device 10, and is output through the speaker 18.

(3) In an answer sentence, the icon determining unit 64b identifies a word related to an area in a frame 70 and not having been spoken by the driver, or a word not having been spoken by the driver. Specifically, the icon determining unit 64b identifies words of "calendar", "rock", "classic", and "wife", and determines icons 7j, 7k, 7l, and 7m that represent the words "calendar", "rock", "classic", and "wife" respectively. The icon determining unit 64b also determines the icon 7f representing an interrogative sentence. The icons 7 are sent to the on-board terminal device 10, and are displayed on the display 16.

(4) The driver determines the need to answer whether or not to attend with his wife, based on at least one of the answer sentence and the icons 7, and speaks "Huh? Ah, I wanna go with my wife".

(5) From the driver's speech of "wanna go with my wife", the input recognition unit 61 recognizes that the driver will go with his wife, and determines that an attribute of the driver's wife should be considered. The statement determining unit 64a causes the external information acquisition unit 57, via the external interoperation unit 65, to find a jazz concert, as preferred by the driver's wife. As a result of the search, three jazz concerts are found. As described above, the natural language dialogue system 100 may utilize an attribute of the driver's partner, for conducting a search. The statement determining unit 64a constructs an answer sentence of "Three jazz concerts—her favorite—are found". The answer sentence is sent to the on-board terminal device 10, and is output through the speaker 18.

(6) Further, as words of attributes in the frame 70 not having been spoken by the driver, words not having been spoken by the driver in the past, and words contained in the answer sentence, the icon determining unit 64b identifies "wife", "jazz", and "concert", and obtains the icon 7m, an icon 7n, and an icon 7o respectively representing "wife", "jazz", and "concert" from the icon DB 67. In a case in which two words are semantically related to each other (in which two words are related to each other with regard to context), it is preferable that the icon determining unit 64b inserts, between icons 7 associated with the two words, another icon (second additional information) which suggest that these words (icons 7) are related to each other. In FIG. 13, between the icon 7m and the icon 7n, the another icon 302 of a heart shape suggesting that "your wife likes jazz" is inserted. As the second additional information (such as the icon 302) helps a user to understand a relationship between icons, the driver can understand what is meant by the icons 7 easily. The icons 7 are sent to the on-board terminal device 10, and are displayed on the display 16.

(7) Based on at least one of the answer sentence and the icons 7, the driver understands a genre of the concerts in the search result. The driver further asks "Is there a piano concert?"

(8) Based on the driver's question, the input recognition unit 61 in the dialogue control server 50 determines that a piano concert is requested. The statement determining unit 64a causes the external information acquisition unit 57, via the external interoperation unit 65, to find a piano concert. As a result of the search, one piano concert is found. The statement determining unit 64a constructs an answer sentence of "One piano concert is found. Would you like to make a reservation?" The answer sentence is sent to the on-board terminal device 10, and is output through the speaker 18.

(9) The icon determining unit 64*b* identifies a word of "piano" contained in the answer sentence, and obtains an icon 7*p* representing a word of "piano" from the icon DB 67. The icon determining unit 64*b* also obtains an icon 7*q* representing a reservation, and the icon 7*f* representing an interrogative sentence, in order to ask the driver whether to make a reservation. The icons 7 are sent to the on-board terminal device 10, and are displayed on the display 16.

(10) Based on at least one of the answer sentence and the icons 7, the driver understands that the driver should answer whether to make a reservation, and the driver speaks "Yes, please".

(11) The input recognition unit 61 determines that an answer for requesting a reservation is received. Next, the action determining unit 64 causes the external information acquisition unit 57, via the external interoperation unit 65, to perform a reservation process to a reservation system. The statement determining unit 64*a* constructs an answer sentence of "Reservation has been completed, and a schedule of the concert is added to your calendar. Would you like to send your wife an invitation mail?" The answer sentence is sent to the on-board terminal device 10, and is output through the speaker 18.

(12) The icon determining unit 64*b* identifies words (stand-alone words) of "reservation, complete, calendar, schedule, add", "wife", and "mail", which are contained in the answer sentence, and obtains an icon 7*r*, the icon 7*m*, and an icon 7*s* representing the words of "reservation, complete, calendar, schedule, add", "wife", and "mail", from the icon DB 67. Note that "reservation, complete, calendar, schedule, add" is associated with one icon 7*r*. This is a type of fixed phrase. By associating one icon 7 with the multiple words, the number of icons to be displayed for an answer sentence can be decreased. The icon determining unit 64*b* also detects that the words "wife" and "mail" are semantically related to each other (there is a relation of "mail to wife" between the words "wife" and "mail") in the answer sentence, and inserts the another icon 301 between the icons 7*m* and 7*s* suggesting that there is a relation between the two icons 7*m* and 7*s*. By inserting the icon 301, the driver can easily understand that a mail is to be sent to the driver's wife. The icons 7 are sent to the on-board terminal device 10, and are displayed on the display 16.

(13) Based on at least one of the answer sentence and the icons 7, the driver determines the need to answer whether to send an invitation mail to the driver's wife, and says "Yes".

(14) The input recognition unit 61 determines that an answer for sending an invitation mail is received. Next, the action determining unit 64 causes the external information acquisition unit 57, via the external interoperation unit 65, to send an invitation mail.

(15) The icon determining unit 64*b* identifies words (stand-alone words) of "wife", "mail", and "calendar, schedule, add" which are contained in the answer sentence, and obtains the icons 7*m*, 7*s* and 7*r* representing the words of "wife", "mail", and "calendar, schedule, add" from the icon DB 67. Note that "calendar, schedule, add" is also a type of fixed phrase. The icons 7 are sent to the on-board terminal device 10, and are displayed on the display 16.

<Use Case 3>

FIG. 14 is a diagram illustrating an example of answers presented by the natural language dialogue system 100 according to the present embodiment.

(1) A driver speaks "What time is it?".

(2) The input recognition unit 61 in the dialogue control server 50 analyzes the speech, and determines that a request for asking current time was issued. If the natural language dialogue system 100 is controlled by a rule such that a next schedule is notified when answering current time, the statement determining unit 64*a* retrieves the driver's next schedule from the user information DB 58 through the external interoperation unit 65. The statement determining unit 64*a* constructs an answer sentence of "Current time is xx:xx. Next video conference will be scheduled in 45 minutes, 4:00 pm in the local time (U.S. time)". The answer sentence is sent to the on-board terminal device 10, and is output through the speaker 18.

(3) The icon determining unit 64*b* identifies "time", "conference", "schedule", and "U.S." as words not having been spoken by the driver in the past or contained in the answer sentence, and determines an icon 7*t*, an icon 7*u*, the icon 7*j*, and an icon 7*v* respectively representing "time", "conference", "schedule", and "U.S.". The icons 7 are sent to the on-board terminal device 10, and are displayed on the display 16.

<Use Case 4>

(1) A driver speaks "How much is this month's electricity bill?"

(2) The input recognition unit 61 in the dialogue control server 50 analyzes the speech, and determines that notification of an electricity bill should be made. The statement determining unit 64*a* retrieves the driver's next schedule from the user information DB 58 through the external interoperation unit 65. The statement determining unit 64*a* causes the external information acquisition unit 57, via the external interoperation unit 65, to retrieve electricity bills of the current month and the previous month, from a system that manages household information of the driver. The statement determining unit 64*a* compares the electricity bill of the current month with the electricity bill of the previous month and identifies a time range having high electricity usage. Further, if a date of payment of the electricity bill is set, the statement determining unit 64*a* sets a reminder. Thus, the statement determining unit 64*a* constructs an answer sentence of "The electricity bill for this month is ¥3000. It increased by ¥1000 as compared with last month, and usage from 19:00 to 20:00 has increased. Reminder of date of payment will be set to your calendar". The answer sentence is sent to the on-board terminal device 10, and is output through the speaker 18.

(3) The icon determining unit 64*b* identifies "bill", "last month", "compare", "19:00 to 20:00", and "date of payment, reminder, set" as words not having been spoken by the driver in the past or contained in the answer sentence, and obtains an icon 7*w*, the icon 7*j*, an icon 7*y*, the icon 7*t*, and the icon 7*r* respectively representing "bill", "last month", "compare", "19:00 to 20:00", and "date of payment, reminder, set". Note that "date of payment, reminder, set" is associated with the single icon 7*r*. The icons 7 are sent to the on-board terminal device 10, and are displayed on the display 16.

<Use Case 5>

FIG. 15 is a diagram illustrating an example of answers presented by the natural language dialogue system 100 according to the present embodiment.

(1) A driver speaks "Tell me a charging station nearby".

(2) The input recognition unit 61 in the dialogue control server 50 analyzes the speech, and determines that a search request of a quick charging station nearby was issued. If no quick charging station is found, the statement determining unit 64*a* proposes an alternative idea. FIG. 15 illustrates a case in which the statement determining unit 64*a* confirms that there is free time in the driver's schedule and the external information acquisition unit 57 searches for a normal charging station having a coffee shop. The statement determining unit 64a constructs an answer sentence of "No vacancy at a quick charging station nearby. Would you like to choose a vacant quick charging station? As there is free time in your calendar, I can show you a normal charging station with a coffee shop". The answer sentence is sent to the on-board terminal device 10, and is output through the speaker 18.

(3) The icon determining unit 64b identifies "quick charging station", "calendar", "coffee shop", and "normal charging station" as words not having been spoken by the driver in the past or contained in the answer sentence, and determines an icon 7z, the icon 7j, an icon 7aa, and an icon 7bb respectively representing "quick charging station", "calendar", "coffee shop", and "normal charging station". The icons 7 are sent to the on-board terminal device 10, and are displayed on the display 16.

<Use Case 6>

(1) A driver asks "Is there any place near here where children can have fun?"

(2) The input recognition unit 61 in the dialogue control server 50 analyzes the speech, and determines that a search request of facility for children was issued. The external information acquisition unit 57 searches for a park and an amusement park through the external interoperation unit 65. If the natural language dialogue system 100 is controlled by a rule such that a facility search needs to be performed by considering weather, the statement determining unit 64a proposes a facility corresponding to the weather. For example, the statement determining unit 64a constructs an answer sentence of "Three parks and an amusement park are found nearby. But as rain is forecasted today, a movie theater is recommended". The answer sentence is sent to the on-board terminal device 10, and is output through the speaker 18.

(3) From the answer sentence, the icon determining unit 64b identifies "park", "amusement park", "rain", and "movie" as words not having been spoken by the driver in the past or contained in the answer sentence, and obtains icons 7cc, 7dd, 7ee, and 7ff respectively representing "park", "amusement park", "rain", and "movie". The icons 7 are sent to the on-board terminal device 10, and are displayed on the display 16.

(4) Based on at least one of the answer sentence and the icons 7, the driver decides which facility to visit, and the driver speaks "I'd like to go to the movie theater".

<Use Case 7>

FIG. 16 is a diagram illustrating an example of answers presented by the natural language dialogue system 100 according to the present embodiment.

(1) A driver speaks "I'd like to make a hotel reservation for my business trip this weekend".

(2) The input recognition unit 61 in the dialogue control server 50 analyzes the speech, and determines that a lodging facility reservation request was issued. In response to the determination, a destination of the driver is set to a frame 70. If the destination is not registered, the driver's destination is inquired. Next, in order to propose a lodging facility, if a method of transportation is not set to the frame 70, the statement determining unit 64a inquires of the driver the method of transportation. The statement determining unit 64a constructs an answer sentence of "Are you going there by car, or by train?" The answer sentence is sent to the on-board terminal device 10, and is output through the speaker 18.

(3) The icon determining unit 64b identifies "car" and "train" from the answer sentence, as words corresponding to attributes of symbols in the frame 70 not having been spoken by the driver in the past, and determines icons 7gg and 7hh that represent "car" and "train" respectively. The icons 7 are sent to the on-board terminal device 10, and are displayed on the display 16.

(4) Based on at least one of the answer sentence and the icons 7, the driver determines the need to answer regarding a method of transportation, and answers "By train".

(5) The input recognition unit 61 analyzes the speech, and the internal state update unit 62 sets the method of transportation to the frame 70. The statement determining unit 64a causes the external information acquisition unit 57, via the external interoperation unit 65, to find a lodging facility near Kyoto station. The statement determining unit 64a extracts a lodging facility suitable for a date obtained from the driver's schedule, the destination (Kyoto), and a hobby (such as ceramics) registered as one of the user attributes. The statement determining unit 64a constructs an answer sentence of "Regarding your business trip to Kyoto on xx/yy, 3 hotels with parking lots having vacant rooms are found near Kyoto station. However, there is a hotel near which a pottery market is held. Would you like to reserve?" The answer sentence is sent to the on-board terminal device 10, and is output through the speaker 18.

(6) From the answer sentence, the icon determining unit 64b identifies "xx/yy", "Kyoto", "station", "hotel", and "pottery" as words corresponding to attributes of symbols in the frame 70 not having been spoken by the driver in the past, words not having been spoken by the driver in the past, or words contained in the answer sentence, and determines the icon 7r, an icon 7ii, the icon 7hh, an icon 7jj, and an icon 7kk respectively representing "xx/yy", "Kyoto", "station", "hotel", and "pottery". The icons 7 are sent to the on-board terminal device 10, and are displayed on the display 16.

(7) Based on at least one of the answer sentence and the icons 7, the driver understands that the need to answer whether or not to reserve at the hotel near which a pottery market is held. The driver answers "Yes, please".

<Re-Outputting Answer Sentence>

As an answer message is associated with an icon 7 in the dialogue information retention unit 38 of the on-board terminal device 10, the speech output unit 35 can output the answer sentence again at a desired timing, through the speaker 18. For example, when a driver taps an icon 7, an answer message which has been transmitted with the icon 7 may be output.

Figure 17:
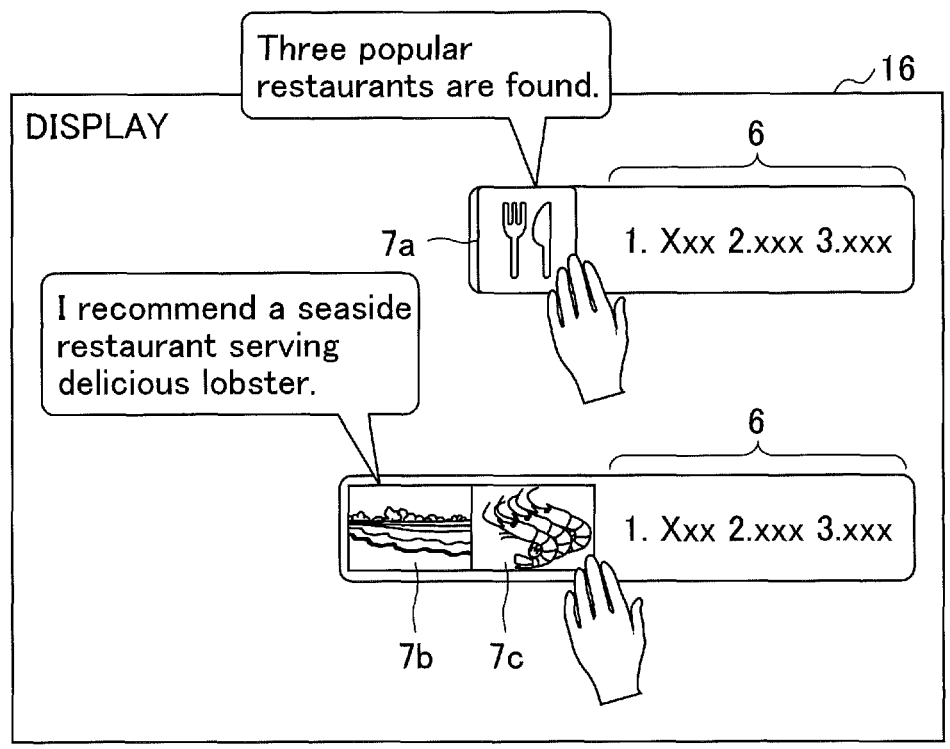
FIG. 17 illustrates examples of displayed icons.

FIG. 17 illustrates examples of icons 7 displayed on the display 16. As illustrated in FIG. 17, when a driver taps an icon 7a, the operation reception unit 37 receives the tap operation, the speech output unit 35 reads out an answer sentence associated with the icon 7a from the dialogue information retention unit 38, and the speech output unit 35 outputs the answer message. Accordingly, the driver can confirm the answer sentence afterward. In a case in which multiple icons (such as icons 7b and 7c) are associated with a single answer sentence, the answer sentence may be output when at least one of the icons (7b and 7c) is tapped. Further, output of an answer sentence may be performed in response to not only a tapping of an icon 7 but also a tapping of options 6.

Further, in a case in which an answer sentence includes information which word in the answer sentence is associated with an icon 7, in response to receiving a tapping operation of the icon, the speech output unit 35 may output only the word associated with the icon 7.

<Hiding Options>

Figure 18B:
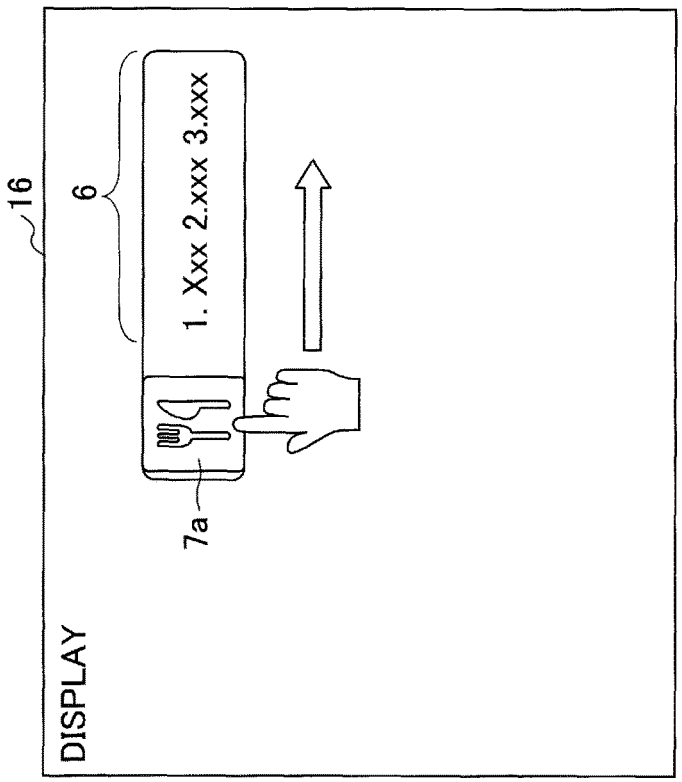
FIG. 18B illustrates an example of re-displaying the hidden options.
Figure 18A:
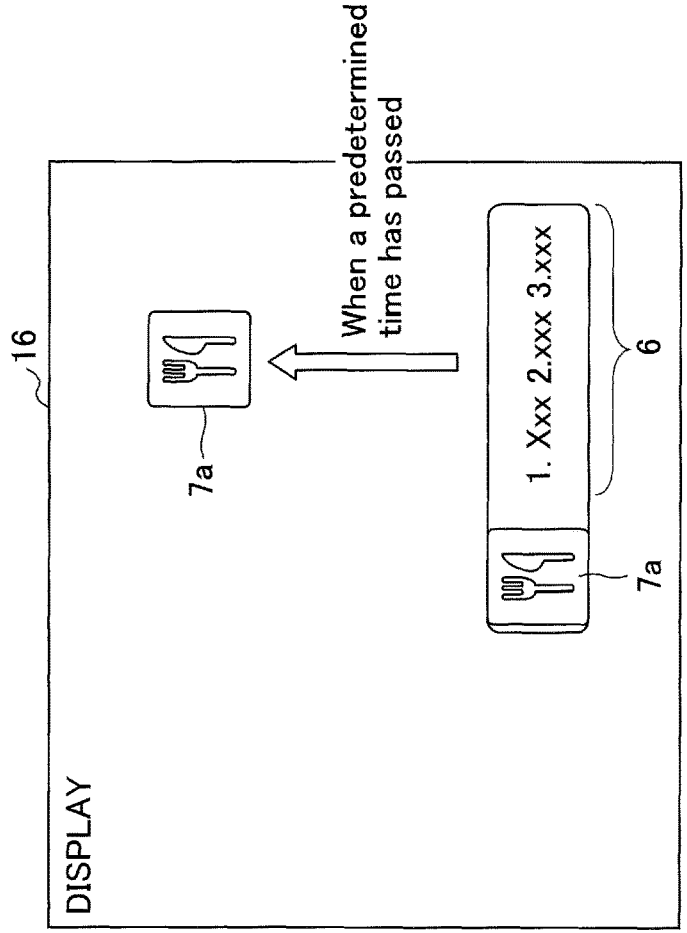
FIG. 18A illustrates a display example of an icon when options are hidden.

FIG. 18A illustrates a display example of an icon when display of options 6 is omitted. When the number of output answer sentences increases, the number of icons 7 transmitted from the dialogue control server 50 also increases. When one or more icons 7, which are transmitted in a single transmission, are displayed on one line of the display 16, an old icon 7 (an icon having been transmitted and displayed previously) scrolls upward (or downward) of the display 16. If a position of the old icon 7 is moved beyond a screen of the display 16, the old icon 7 is deleted. As the old icon 7 becomes older, options 6 which are displayed with the old icon 7 become less likely to be seen by a driver, and necessity of displaying the options 6 becomes lower. Thus, when a predetermined period of time has passed after options 6 have been displayed, the display control unit 36 hides the options 6 (changes a state of the options 6 into a non-displayed (hidden) state). FIG. 18A illustrates a case in which options 6 associated with an icon 7a are changed to the hidden state.

Also, as illustrated in FIG. 18B, when a driver taps the icon 7a, the display control unit 36 displays the hidden options 6 again. At this time, an answer sentence associated with the icon 7a may also be output. Alternatively, the answer sentence may not be output. As described above, because old options 6 are hidden, the display 16 can be utilized efficiently. Further, a driver can check contents of the options 6 at a desired time.

Figure 19:
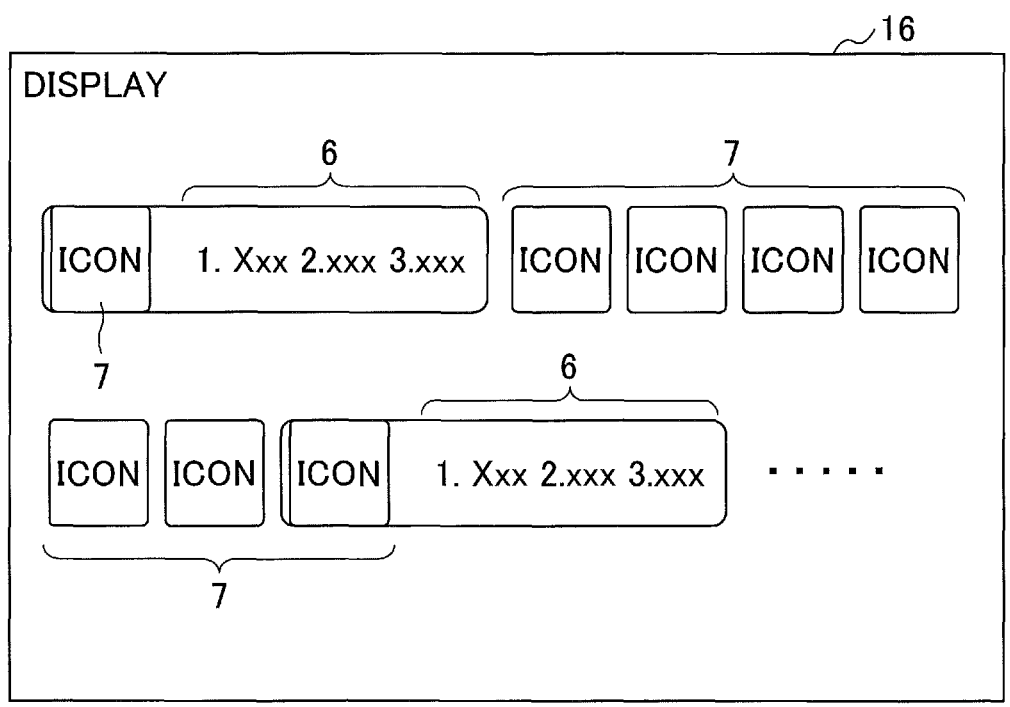
FIG. 19 illustrates examples of displayed icons.

A method of displaying icons 7 is not limited to the above mentioned method (icon(s) 7 having been transmitted in a single transmission is/are displayed on one line of the display 16). As illustrated in FIG. 19, icons 7 as many as possible may be displayed on a single line. FIG. 19 illustrates a case in which an icon 7 having options 6 and icons 7 not having options 6 are displayed on a line in the order that the icons 7 are transmitted from the dialogue control server 50. For example, the display control unit 36 in the on-board terminal device 10 displays the icons 7 and the options 6 from the top left of the display 16 toward a line direction (horizontal direction) sequentially. When a display position of an icon 7 (or options 6) reaches a right end of the display 16, line feed is performed and the display control unit 36 restarts displaying an icon 7 (or options 6) from a left end of a next line. By employing the displaying method described here with reference to FIG. 19, if options 6 are hidden as illustrated in FIG. 18B, icons 7 are packed to the left (left-aligned) and a large number of icons 7 can be displayed on a single screen of the display 16. Thus, in this displaying method, the effect of hiding options 6 becomes large.

<Display Method when Car is Stopped>

In a case in which the car 8 is stopped, the display control unit 36 may display hidden options 6 again. Further, in a case in which the car 8 is stopped, the display control unit 36 may also display figures such as time contained in an answer sentence.

Figure 20B:
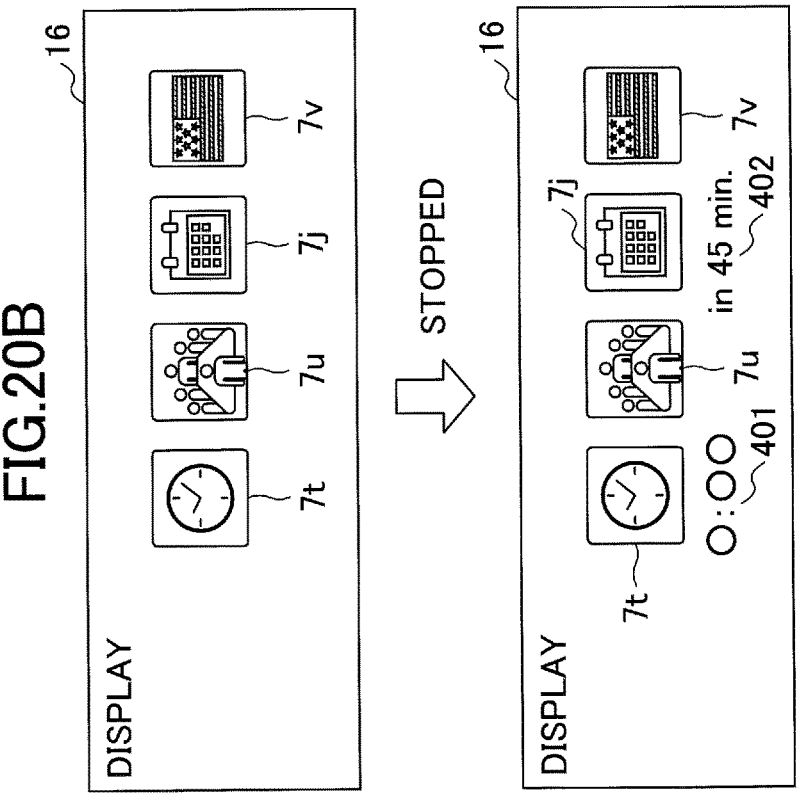
FIGS. 20A and 20B are diagrams illustrating how icons are displayed when a car is stopped.
Figure 20A:
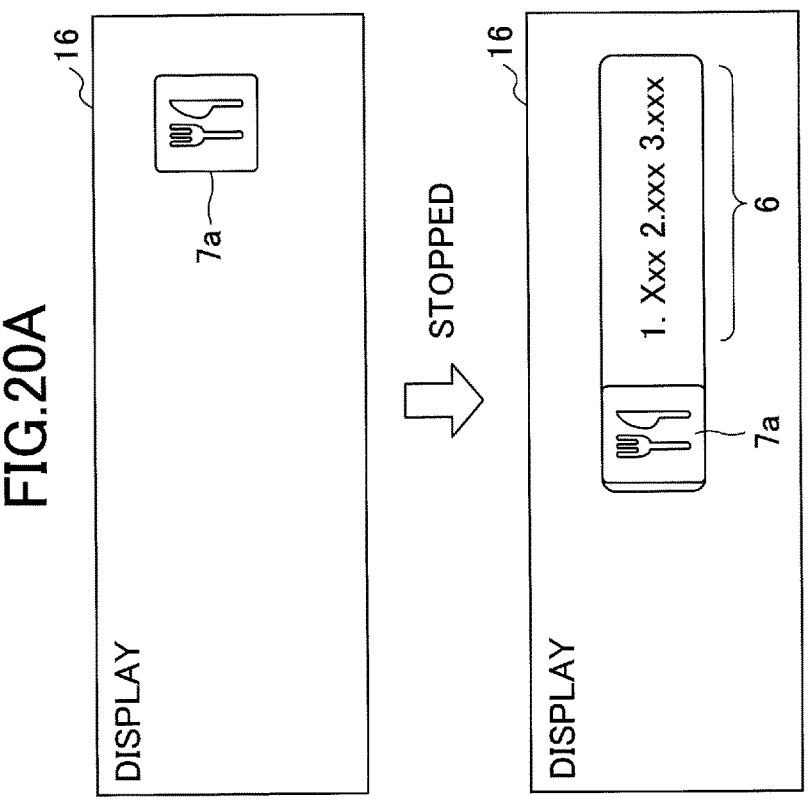

FIG. 20A illustrates a case in which options 6 are hidden because a predetermined time has elapsed after the options 6 have been displayed, but in which the display control unit 36 displays the options 6 again because the car 8 has stopped. If options 6 are displayed as described above, a driver can look at the options 6 associated with an icon 7, while the car 8 is being stopped. FIG. 20B illustrates a case in which, when the car 8 is stopped, a current time 401 and a period of time 402 until a video conference will start are displayed. Accordingly, a driver can see a time of a scheduled event. Note that a time contained in an answer sentence is transmitted from the dialogue control server 50 in a state associated with an icon 7.

Information displayed while the car 8 is being stopped is not limited to figures. At least part of information contained in an answer sentence can be displayed. The part of information contained in an answer sentence (or an entire answer sentence) may be displayed in a state associated with an icon 7 with which the answer sentence is associated (for example, the part of information may be displayed near the icon 7). Alternatively, an entire answer sentence may be displayed. Further, a part or an entire answer sentence may be displayed in response to a tapping operation of an icon by a driver while the car 8 is being stopped (note that the display operation may also be permitted while the car 8 is moving, such as the car 8 is autonomously driven, as long as a state of the car 8 is within an extent permitted by law).

Whether the car 8 is stopped or not may be determined based on at least one of the following events: an event that speed of the car 8 detected by a speed sensor is reduced to zero or less than a predetermined value, an event that a gearlever is shifted to a P (parking) position, and an event that a parking brake is applied. The speed sensor may be installed in the car 8, or may be installed in the on-board terminal device 10.

<Homophone>

A technique is known in which a system checks intent of a user's speech, in a case in which a homophone is contained in the user's speech. In the present embodiment, a case in which a homophone is contained in an answer sentence may occur. Thus, in the present embodiment, when a homophone is contained in an answer sentence, the natural language dialogue system 100 displays an icon 7 corresponding to the homophone. Because the icon 7 corresponding to the homophone is displayed, intent of the answer sentence can be clearly transmitted to a driver.

Figure 21:
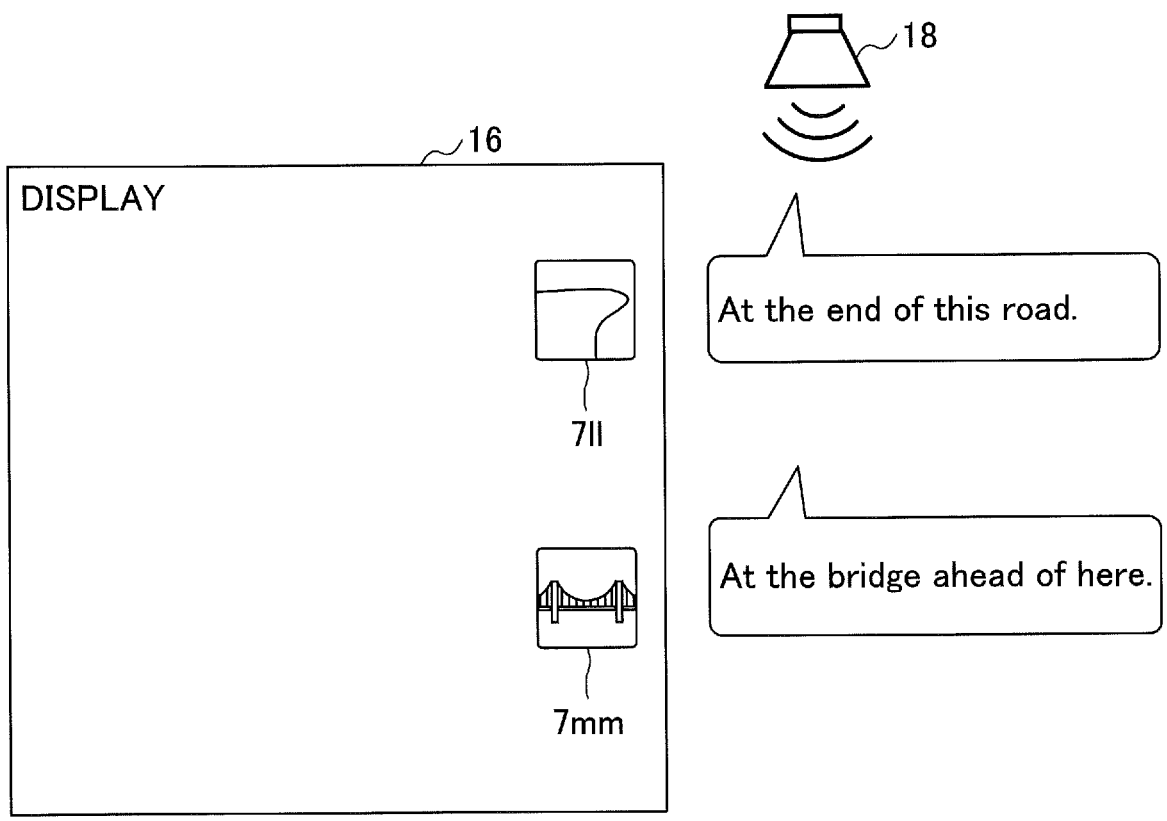
FIG. 21 illustrates examples of icons displayed when the dialogue control unit constructs an answer sentence containing homophone.

FIG. 21 illustrates examples of icons 7 displayed on the display 16 when the dialogue control unit 55 constructs an answer sentence containing a homophone. In the example of FIG. 21, when an answer message is "At the end of this road", the icon determining unit 64b determines an icon 711 that recalls an "end" (note that, in Japanese, "end" is called "Hashi") to be displayed. Further, when an answer message is "At the bridge ahead of here", the icon determining unit 64b determines an icon 7mm that recalls a "bridge" (note that, in Japanese, "bridge" is also called "Hashi") to be displayed.

When a driver does not expect that an answer message includes a homophone such as "end" or "bridge", the driver may be confused. In the present embodiment, as a meaning of a homophone is displayed as an icon 7, the driver can easily understand a meaning of the answer sentence.

<Conclusion>

As described above, because the natural language dialogue system 100 according to the present embodiment displays the gist of a recognized topic as an icon 7, a driver can intuitively understand an outline of speech of the natural language dialogue system 100 (what is recommended by the natural language dialogue system 100).

<Other Suitable Applications>

Although the embodiments of the present invention have been described above, the present invention is not limited to the specific embodiments described above. Various changes or enhancements can be made hereto within the scope of the present invention.

For example, an icon may be a static one or a dynamic one (animated icon). The animated icon can be realized by displaying slightly different still images sequentially. Alternatively, an icon may be data of a moving picture format such as MPEG or H.264.

Further, it is preferable that an icon 7 and a corresponding answer sentence are transmitted to the on-board terminal device 10 within a short period. However, the icon 7 may be transmitted after the corresponding answer sentence has been transmitted. The reason is that as an icon 7 is displayed on the display 16, a driver can see the icon 7 afterward. Another reason is that a time for retrieval of an icon 7 by the external information acquisition unit 57 may be required in a case in which the icon 7 is not registered with the icon DB 67.

Further, when the statement determining unit 64a provides the number of options, the icon determining unit 64b may transmit the same number of icons related to the options as the number of the options to the on-board terminal device 10. For example, in a case in which two parking lots accepting a discount coupon are found, the icon determining unit 64b may transmit two identical icons each representing a discount coupon, and the display control unit 36 may display the two identical icons. According to this displaying method of icons, a driver can intuitively recognize the number of options.

Further, the dialogue control server 50 may transmit audio data to the on-board terminal device 10, instead of an icon 7 (or in addition to the icon 7). The on-board terminal device 10 plays sound based on the audio data. For example, when an icon 7 representing rock music is displayed, if rock music is also played back, a driver can easily imagine a meaning of the icon. The audio data may be played back at a desired timing, in response to a tapping operation of an icon 7.

The above described embodiment describes a case in which a driver (user) driving a moving body (vehicle) such as a car (automobile) uses the natural language dialogue system 100. However, the above described embodiment is applicable to cases when a user is operating other vehicles than a car. For example, the vehicle may be a bicycle or a motorcycle. Also, because the on-board terminal device 10 may be an information processing device such as a smartphone, a pedestrian carrying the on-board terminal device 10 (may be simply referred to as a "terminal device") can use the natural language dialogue system 100. Further, a user sitting in front of a desk can use the natural language dialogue system 100.

Further, the above described embodiment describes a case in which the dialogue control server 50 transmits an answer sentence, an icon, and the like, to the on-board terminal device 10. However, the on-board terminal device 10 may have functions of the dialogue control server 50. In a case in which the on-board terminal device 10 may have functions of the dialogue control server 50, the on-board terminal device 10 corresponds to the information presentation device.

Further, as the examples of configurations such as FIG. 5 or FIG. 6 are illustrated to facilitate understanding of the on-board terminal device 10 and the dialogue control server 50, the present invention is not limited by a way of dividing functional units, or not limited by names of functions. Functions of the on-board terminal device 10 and the dialogue control server 50 may be divided into more functional blocks, depending on contents of functions. Alternatively, a functional block in the on-board terminal device 10 or the dialogue control server 50 may be configured to include multiple types of functions.

The display 16 is an example of a displaying means (unit), the microphone 19, the buttons 15, or the touch panel 17 is an example of an input receiving means (unit), the statement determining unit 64a is an example of an answer generating means (unit), the icon determining unit 64b is an example of an additional information acquiring means (unit), the speech output unit 35 is an example of a voice outputting means (unit), the display control unit 36 is an example of an information outputting means (unit), the external information acquisition unit 57 is an example of a searching means (unit), the dialogue information retention unit 38 is an example of an information storage means (unit), the operation reception unit 37 is an example of an operation receiving means (unit), the system statement transmitting unit 53 and/or the display information transmitting unit 54 is an example of a transmitting means (unit), and the natural language dialogue system 100 is an example of the information presentation device.

What is claimed is:

1. An information presentation device comprising:
    a display device including a touch panel configured to receive an operation from a user with respect to an object displayed on the display device;
    a microphone;
    a speaker;
    a processor; and
    a memory storing a computer program that causes the processor to perform processes including
        receiving an input from a user through the microphone;
        generating an answer sentence in response to the input received from the user;
        acquiring icon data that represents a word contained in the generated answer sentence;
        storing the generated answer sentence and the acquired icon data in the memory, the acquired icon data being stored in a state associated with the generated answer sentence;
        outputting the generated answer sentence through the speaker by sound;
        outputting an icon on the display device based on the acquired icon data; and
        in response to the icon on the display device being operated by the user through the touch panel, reading out the generated answer sentence associated with the icon, from the memory, and outputting the generated answer sentence again by sound.

2. The information presentation device according to claim 1, wherein the icon data is related to a word needed to ask the user for confirmation, among words contained in the generated answer sentence.

3. The information presentation device according to claim 1, wherein the icon data is related to a word which is not input by the user, among words contained in the generated answer sentence.

4. The information presentation device according to claim 1, the processes further comprising
    finding information for answering in an answer sentence to be generated, based on the input received from the user, and
    generating a plurality of options to be attached to the icon, the plurality of options being generated based on the information found, wherein
    the icon is output on the display device followed by the options.

5. The information presentation device according to claim 4, the processes further comprising
    changing a display status of the options into a hidden state, when a predetermined period of time elapses after the icon and the options have been output on the display device.

6. The information presentation device according to claim 5, wherein the display status of the options changes between a displayed state and the hidden state, in response to the icon on the display device being operated by the user through the touch panel.

7. The information presentation device according to claim 1, wherein
the information presentation device is installed in a vehicle, and
the processes further comprise outputting on the display device, at least part of the generated answer sentence stored in the memory in response to stopping of the vehicle, in a state in which the at least part of the generated answer sentence is associated with the icon associated with the generated answer sentence.

8. The information presentation device according to claim 7, wherein the at least part of the generated answer sentence stored in the memory is output on the display device in response to the icon on the display device being operated by the user through the touch panel while the vehicle is stopped.

9. The information presentation device according to claim 1, the processes further comprising
acquiring, in a case in which two words contained in the generated answer sentence are semantically related to each other, another icon data suggesting that the two words are related to each other, and
outputting a third icon based on the another icon data between a first icon related to a first word of the two words and a second icon related to a second word of the two words.

10. An information presentation system comprising:
an information processing apparatus; and
a terminal device communicable with the information processing apparatus via a network;
the information processing apparatus including a processor, and a memory storing a computer program that causes the processor to implement functions of
an answer generating unit configured to generate an answer sentence in response to an input received from the terminal device;
an additional information acquiring unit configured to acquire icon data that represents a word contained in the answer sentence generated by the answer generating unit; and
a transmitting unit configured to transmit the generated answer sentence and the icon data to the terminal device;
the terminal device including a display device including a touch panel, a microphone configured to receive the input from a user, a speaker, a processor, and a memory storing a computer program that causes the processor to implement functions of
an information storage unit configured to store the generated answer sentence and the icon data received from the information processing apparatus, the icon data being stored in a state associated with the generated answer sentence;
a voice outputting unit configured to output, through the speaker, the generated answer sentence by sound;
an information outputting unit configured to output an icon on the display device based on the icon data; and
an operation receiving unit configured to receive, through the touch panel, an operation with respect to an object displayed on the display device;
wherein, when the operation receiving unit receives an operation with respect to the icon displayed on the display device from the user after the icon is output on the display device, the voice outputting unit is configured to read out, from the information storage unit, the generated answer sentence associated with the icon data of the icon, and to output the generated answer sentence again by sound.

11. A terminal device communicable with an information processing apparatus via a network, the information processing apparatus including an answer generating unit configured to generate an answer sentence in response to an input received from the terminal device, an additional information acquiring unit configured to acquire icon data that represents a word contained in the answer sentence generated by the answer generating unit, and a transmitting unit configured to transmit the generated answer sentence and the icon data to the terminal device;
the terminal device comprising:
a display device including a touch panel;
a microphone configured to receive the input from a user;
a speaker;
a processor; and a memory storing a computer program that causes the processor to implement functions of
an information storage unit configured to store the generated answer sentence and the icon data received from the information processing apparatus, the icon data being stored in a state associated with the generated answer sentence;
a voice outputting unit configured to output, through the speaker, the generated answer sentence by sound; and
an information outputting unit configured to output an icon on the-display device based on the icon data; and
an operation receiving unit configured to receive, through the touch panel, an operation with respect to an object displayed on the display device;
wherein, when the operation receiving unit receives an operation with respect to the icon displayed on the display device from the user after the icon is output on the display device, the voice outputting unit is configured to read out, from the information storage unit, the generated answer sentence associated with the icon data of the icon, and to output the generated answer sentence again by sound.

* * * * *